(12) United States Patent
Hoirup

(10) Patent No.: US 9,769,826 B2
(45) Date of Patent: Sep. 19, 2017

(54) METHOD AND APPARATUS FOR BAND TUNING IN A COMMUNICATION DEVICE

(75) Inventor: Carsten Hoirup, Raleigh, NC (US)

(73) Assignee: BlackBerry Limited, Waterloo (CA)

( * ) Notice: Subject to any disclaimer, the term of this patent is extended or adjusted under 35 U.S.C. 154(b) by 38 days.

(21) Appl. No.: 14/235,994

(22) PCT Filed: Aug. 6, 2012

(86) PCT No.: PCT/US2012/049723
§ 371 (c)(1),
(2), (4) Date: May 28, 2014

(87) PCT Pub. No.: WO2013/022826
PCT Pub. Date: Feb. 14, 2013

(65) Prior Publication Data
US 2014/0256325 A1    Sep. 11, 2014

Related U.S. Application Data

(60) Provisional application No. 61/515,424, filed on Aug. 5, 2011.

(51) Int. Cl.
*H03F 1/14* (2006.01)
*H03G 3/20* (2006.01)
(Continued)

(52) U.S. Cl.
CPC ...... *H04W 72/0453* (2013.01); *H04B 1/0458* (2013.01); *H04B 1/18* (2013.01); *H04W 36/24* (2013.01); *H04W 52/04* (2013.01)

(58) Field of Classification Search
CPC ...... H04B 1/0053; H04B 1/0458; H04B 1/18; H04B 1/0475; H04B 1/109; H04B 1/12;
(Continued)

(56) References Cited

U.S. PATENT DOCUMENTS 2,745,067 A    5/1956    True
3,117,279 A    1/1964    Ludvigson
(Continued)

FOREIGN PATENT DOCUMENTS

DE    19614655    10/1997
DE    102008050743    4/2010
(Continued)

OTHER PUBLICATIONS

Payandehjoo, Kasra et al., "Investigation of Parasitic Elements for Coupling Reduction in MultiAntenna Hand-Set Devices", Published online Jan. 22, 2013 in Wiley Online Library (wileyonlinelibrary.com).
(Continued)

*Primary Examiner* — Yuwen Pan
*Assistant Examiner* — Paul P Tran
(74) *Attorney, Agent, or Firm* — Guntin & Gust, PLC; Jay H. Anderson

(57) ABSTRACT

A system that incorporates teachings of the present disclosure may include, for example, adjusting a tuning state of a matching network of the communication device, selecting a power offset from among a group of power offsets where the selected power offset is associated with a sub-band of operation of the communication device, and adjusting a value associated with a measured receive power or a transmit power of the communication device based on the selected power offset to generate an offset power value. Additional embodiments are disclosed.

20 Claims, 11 Drawing Sheets

(51) Int. Cl.

| | | |
|---|---|---|
| H03F 3/68 | (2006.01) | |
| H03G 11/04 | (2006.01) | |
| H01P 5/08 | (2006.01) | |
| H03H 7/38 | (2006.01) | |
| H01Q 1/24 | (2006.01) | |
| H01Q 1/50 | (2006.01) | |
| H04L 12/50 | (2006.01) | |
| H04Q 11/00 | (2006.01) | |
| G01R 31/08 | (2006.01) | |
| G06F 11/00 | (2006.01) | |
| G08C 15/00 | (2006.01) | |
| H04J 1/16 | (2006.01) | |
| H04J 3/14 | (2006.01) | |
| H04L 1/00 | (2006.01) | |
| H04L 12/26 | (2006.01) | |
| H04B 1/40 | (2015.01) | |
| H03D 5/00 | (2006.01) | |
| H04W 36/00 | (2009.01) | |
| H04W 72/00 | (2009.01) | |
| H04B 7/00 | (2006.01) | |
| H04W 72/04 | (2009.01) | |
| H04B 1/04 | (2006.01) | |
| H04B 1/18 | (2006.01) | |
| H04W 36/24 | (2009.01) | |
| H04W 52/04 | (2009.01) | |

(58) Field of Classification Search
CPC .......... H04B 1/40; H03H 7/0123; H03H 7/20; H03H 7/38; H03H 7/40; H03H 11/28; H03H 11/30; H01P 1/181; H01P 1/213; H01P 1/2056; H03F 1/56; H03F 2200/318; H03F 2200/387; H03F 2200/451; H03F 3/68; H03F 3/211; H01L 27/0808; H04W 72/0453; H04W 24/02; H03J 5/246; H03J 3/00; H01C 1/241; H05H 1/46; H01Q 1/241
USPC ........ 455/67.11, 69, 73, 77, 78, 82, 87, 121, 455/142, 150.1, 154.1, 169.1, 170.1, 455/173.1, 180.1, 334, 419, 422.1, 426.1, 455/432.1, 433, 434, 436, 450.1, 466, 455/522, 565, 575.5, 575.6; 330/129, 330/295, 305, 310; 333/17.1, 17.3, 32, 333/105, 109, 164; 370/447, 461
See application file for complete search history.

(56) References Cited

U.S. PATENT DOCUMENTS

| | | | |
|---|---|---|---|
| 3,160,832 A | 12/1964 | Beitman | |
| 3,390,337 A | 6/1968 | Beitman | |
| 3,443,231 A | 5/1969 | Roza | |
| 3,509,500 A | 4/1970 | McNair | |
| 3,571,716 A | 3/1971 | Hill | |
| 3,590,385 A | 6/1971 | Sabo | |
| 3,601,717 A | 8/1971 | Kuecken | |
| 3,742,279 A | 6/1973 | Kupsky | |
| 3,794,941 A | 2/1974 | Templin | |
| 3,919,644 A | 11/1975 | Smolka | |
| 3,990,024 A | 11/1976 | Hou | |
| 3,995,237 A | 11/1976 | Brunner | |
| 4,186,359 A | 1/1980 | Kaegebein | |
| 4,201,960 A | 5/1980 | Skutta | |
| 4,227,256 A | 10/1980 | O'Keefe | |
| 4,383,441 A | 5/1983 | Willis | |
| 4,476,578 A | 10/1984 | Gaudin | |
| 4,493,112 A | 1/1985 | Bruene | |
| 4,509,019 A | 4/1985 | Banu et al. | |
| 4,777,490 A | 10/1988 | Sharma | |
| 4,799,066 A | 1/1989 | Deacon | |
| 4,965,607 A | 10/1990 | Wilkins | |
| 4,980,656 A | 12/1990 | Duffalo | |
| 5,032,805 A | 7/1991 | Elmer | |
| 5,136,478 A | 8/1992 | Bruder | |
| 5,142,255 A | 8/1992 | Chang | |
| 5,177,670 A | 1/1993 | Shinohara | |
| 5,195,045 A | 3/1993 | Keane | |
| 5,200,826 A | 4/1993 | Seong | |
| 5,212,463 A | 5/1993 | Babbitt | |
| 5,230,091 A | 7/1993 | Vaisanen et al. | |
| 5,243,358 A | 9/1993 | Sanford | |
| 5,258,728 A | 11/1993 | Taniyoshi | |
| 5,276,912 A | 1/1994 | Siwiak | |
| 5,301,358 A | 4/1994 | Gaskill | |
| 5,307,033 A | 4/1994 | Koscica | |
| 5,310,358 A | 5/1994 | Johnson | |
| 5,312,790 A | 5/1994 | Sengupta | |
| 5,334,958 A | 8/1994 | Babbitt | |
| 5,371,473 A | 12/1994 | Trinh | |
| 5,409,889 A | 4/1995 | Das | |
| 5,427,988 A | 6/1995 | Sengupta | |
| 5,430,417 A | 7/1995 | Martin | |
| 5,446,447 A | 8/1995 | Carney | |
| 5,448,252 A | 9/1995 | Ali | |
| 5,451,567 A | 9/1995 | Das | |
| 5,451,914 A | 9/1995 | Stengel | |
| 5,457,394 A | 10/1995 | McEwan | |
| 5,472,935 A | 12/1995 | Yandrofski | |
| 5,479,139 A | 12/1995 | Koscica | |
| 5,486,491 A | 1/1996 | Sengupta | |
| 5,496,795 A | 3/1996 | Das | |
| 5,502,372 A | 3/1996 | Quan | |
| 5,524,281 A | 6/1996 | Bradley | |
| 5,548,837 A | 8/1996 | Hess et al. | |
| 5,561,407 A | 10/1996 | Koscica | |
| 5,564,086 A | 10/1996 | Cygan | |
| 5,589,844 A | 12/1996 | Belcher et al. | |
| 5,593,495 A | 1/1997 | Masuda | |
| 5,635,433 A | 6/1997 | Sengupta | |
| 5,635,434 A | 6/1997 | Sengupta | |
| 5,640,042 A | 6/1997 | Koscica | |
| 5,679,624 A | 10/1997 | Das | |
| 5,689,219 A | 11/1997 | Piirainen | |
| 5,693,429 A | 12/1997 | Sengupta | |
| 5,694,134 A | 12/1997 | Barnes | |
| 5,699,071 A | 12/1997 | Urakami | |
| 5,721,194 A | 2/1998 | Yandrofski | |
| 5,766,697 A | 6/1998 | Sengupta | |
| 5,777,581 A | 7/1998 | Lilly | |
| 5,778,308 A | 7/1998 | Sroka | |
| 5,786,727 A | 7/1998 | Sigmon | |
| 5,812,572 A | 9/1998 | King | |
| 5,812,943 A | 9/1998 | Suzuki | |
| 5,830,591 A | 11/1998 | Sengupta | |
| 5,846,893 A | 12/1998 | Sengupta | |
| 5,874,926 A | 2/1999 | Tsuru | |
| 5,880,635 A | 3/1999 | Satoh | |
| 5,886,867 A | 3/1999 | Chivukula | |
| 5,892,482 A | 4/1999 | Coleman et al. | |
| 5,929,717 A | 7/1999 | Richardson | |
| 5,963,871 A | 10/1999 | Zhinong | |
| 5,969,582 A | 10/1999 | Boesch | |
| 5,982,099 A | 11/1999 | Barnes et al. | |
| 5,990,766 A | 11/1999 | Zhang | |
| 6,009,124 A | 12/1999 | Smith | |
| 6,020,787 A | 2/2000 | Kim | |
| 6,020,795 A | 2/2000 | Kim | |
| 6,029,075 A | 2/2000 | Das | |
| 6,045,932 A | 4/2000 | Jia | |
| 6,061,025 A | 5/2000 | Jackson | |
| 6,064,865 A | 5/2000 | Kuo et al. | |
| 6,074,971 A | 6/2000 | Chiu | |
| 6,096,127 A | 8/2000 | Dimos | |
| 6,100,733 A | 8/2000 | Dortu | |
| 6,101,102 A | 8/2000 | Brand | |
| 6,115,585 A | 9/2000 | Matero | |
| 6,125,266 A | 9/2000 | Matero et al. | |
| 6,133,883 A | 10/2000 | Munson | |

(56) References Cited

U.S. PATENT DOCUMENTS

| | | | |
|---|---|---|---|
| 6,172,385 B1 | 1/2001 | Duncombe |
| 6,215,644 B1 | 4/2001 | Dhuler |
| 6,242,989 B1 | 6/2001 | Barber |
| 6,266,528 B1 | 7/2001 | Farzaneh |
| 6,281,748 B1 | 8/2001 | Klomsdorf et al. |
| 6,281,847 B1 | 8/2001 | Lee |
| 6,309,895 B1 | 10/2001 | Jaing |
| 6,343,208 B1 | 1/2002 | Ying |
| 6,377,142 B1 | 4/2002 | Chiu |
| 6,377,217 B1 | 4/2002 | Zhu |
| 6,377,440 B1 | 4/2002 | Zhu |
| 6,384,785 B1 | 5/2002 | Kamogawa |
| 6,404,614 B1 | 6/2002 | Zhu |
| 6,408,190 B1 | 6/2002 | Ying |
| 6,414,562 B1 | 7/2002 | Bouisse |
| 6,415,562 B1 | 7/2002 | Donaghue |
| 6,452,776 B1 | 9/2002 | Chakravorty |
| 6,461,930 B2 | 10/2002 | Akram |
| 6,466,774 B1 | 10/2002 | Okabe |
| 6,492,883 B2 | 12/2002 | Liang |
| 6,514,895 B1 | 2/2003 | Chiu |
| 6,525,630 B1 | 2/2003 | Zhu |
| 6,531,936 B1 | 3/2003 | Chiu |
| 6,535,076 B2 | 3/2003 | Partridge |
| 6,535,722 B1 | 3/2003 | Rosen |
| 6,538,603 B1 | 3/2003 | Chen |
| 6,556,102 B1 | 4/2003 | Sengupta |
| 6,556,814 B1 | 4/2003 | Klomsdorf |
| 6,570,462 B2 | 5/2003 | Edmonson |
| 6,590,468 B2 | 7/2003 | du Toit |
| 6,590,541 B1 | 7/2003 | Schultze |
| 6,597,265 B2 | 7/2003 | Liang |
| 6,608,603 B2 | 8/2003 | Alexopoulos |
| 6,624,786 B2 | 9/2003 | Boyle |
| 6,640,085 B1 | 10/2003 | Chatzipetros |
| 6,657,595 B1 | 12/2003 | Phillips |
| 6,661,638 B2 | 12/2003 | Jackson |
| 6,670,256 B2 | 12/2003 | Yang |
| 6,710,651 B2 | 3/2004 | Forrester |
| 6,724,611 B1 | 4/2004 | Mosley |
| 6,724,890 B1 | 4/2004 | Bareis |
| 6,737,179 B2 | 5/2004 | Sengupta |
| 6,759,918 B2 | 7/2004 | Du Toit |
| 6,765,540 B2 | 7/2004 | Toncich |
| 6,768,472 B2 | 7/2004 | Alexopoulos |
| 6,774,077 B2 | 8/2004 | Sengupta |
| 6,795,712 B1 | 9/2004 | Vakilian |
| 6,825,818 B2 | 11/2004 | Toncich |
| 6,839,028 B2 | 1/2005 | Lee |
| 6,845,126 B2 | 1/2005 | Dent |
| 6,859,104 B2 | 2/2005 | Toncich |
| 6,862,432 B1 | 3/2005 | Kim |
| 6,864,757 B2 | 3/2005 | Du Toit |
| 6,868,260 B2 | 3/2005 | Jagielski |
| 6,875,655 B2 | 4/2005 | Lin |
| 6,888,714 B2 | 5/2005 | Shaw |
| 6,905,989 B2 | 6/2005 | Ellis |
| 6,907,234 B2 | 6/2005 | Karr |
| 6,920,315 B1 | 7/2005 | Wilcox et al. |
| 6,922,330 B2 | 7/2005 | Nielsen |
| 6,943,078 B1 | 9/2005 | Zheng |
| 6,946,847 B2 | 9/2005 | Nishimori |
| 6,949,442 B2 | 9/2005 | Barth |
| 6,961,368 B2 | 11/2005 | Dent |
| 6,964,296 B2 | 11/2005 | Memory |
| 6,965,837 B2 | 11/2005 | Vintola |
| 6,987,493 B2 | 1/2006 | Chen |
| 6,993,297 B2 | 1/2006 | Smith |
| 6,999,297 B1 | 2/2006 | Klee |
| 7,009,455 B2 | 3/2006 | Toncich |
| 7,071,776 B2 | 7/2006 | Forrester |
| 7,106,715 B1 | 9/2006 | Kelton |
| 7,107,033 B2 | 9/2006 | du Toit |
| 7,113,614 B2 | 9/2006 | Rhoads |
| 7,151,411 B2 | 12/2006 | Martin |
| 7,176,634 B2 | 2/2007 | Kitamura |
| 7,176,845 B2 | 2/2007 | Fabrega-Sanchez |
| 7,180,467 B2 | 2/2007 | Fabrega-Sanchez |
| 7,221,327 B2 | 5/2007 | Toncich |
| 7,298,329 B2 | 11/2007 | Diament |
| 7,312,118 B2 | 12/2007 | Kiyotoshi |
| 7,332,980 B2 | 2/2008 | Zhu |
| 7,332,981 B2 | 2/2008 | Matsuno |
| 7,339,527 B2 | 3/2008 | Sager |
| 7,369,828 B2 | 5/2008 | Shamsaifar |
| 7,426,373 B2 | 9/2008 | Clingman |
| 7,427,949 B2 | 9/2008 | Channabasappa et al. |
| 7,453,405 B2 | 11/2008 | Nishikido et al. |
| 7,468,638 B1 | 12/2008 | Tsai |
| 7,469,129 B2 | 12/2008 | Blaker et al. |
| 7,531,011 B2 | 5/2009 | Yamasaki |
| 7,535,080 B2 | 5/2009 | Zeng et al. |
| 7,535,312 B2 | 5/2009 | McKinzie |
| 7,539,527 B2 | 5/2009 | Jang |
| 7,557,507 B2 | 7/2009 | Wu |
| 7,596,357 B2 | 9/2009 | Nakamata |
| 7,633,355 B2 | 12/2009 | Matsuo |
| 7,642,879 B2 | 1/2010 | Matsuno |
| 7,655,530 B2 | 2/2010 | Hosking |
| 7,667,663 B2 | 2/2010 | Hsiao |
| 7,671,693 B2 | 3/2010 | Brobston et al. |
| 7,705,692 B2 | 4/2010 | Fukamachi et al. |
| 7,711,337 B2 | 5/2010 | McKinzie |
| 7,714,676 B2 | 5/2010 | McKinzie |
| 7,728,693 B2 | 6/2010 | du Toit et al. |
| 7,768,400 B2 | 8/2010 | Lawrence et al. |
| 7,786,819 B2 | 8/2010 | Ella |
| 7,795,990 B2 | 9/2010 | du Toit |
| 7,852,170 B2 | 12/2010 | McKinzie |
| 7,865,154 B2 | 1/2011 | Mendolia |
| 7,907,094 B2 | 3/2011 | Kakitsu et al. |
| 7,917,104 B2 | 3/2011 | Manssen et al. |
| 7,949,309 B2 | 5/2011 | Rofougaran |
| 7,969,257 B2 | 6/2011 | du Toit |
| 7,991,363 B2 | 8/2011 | Greene |
| 8,008,982 B2 | 8/2011 | McKinzie |
| 8,072,285 B2 | 12/2011 | Spears |
| 8,112,043 B2 | 2/2012 | Knudsen et al. |
| 8,170,510 B2 | 5/2012 | Knudsen et al. |
| 8,190,109 B2 | 5/2012 | Ali et al. |
| 8,204,446 B2 | 6/2012 | Scheer |
| 8,217,732 B2 | 7/2012 | McKinzie |
| 8,299,867 B2 | 10/2012 | McKinzie |
| 8,320,850 B1 | 11/2012 | Khlat |
| 8,442,457 B2 | 5/2013 | Harel et al. |
| 8,472,888 B2 | 6/2013 | Manssen et al. |
| 8,543,176 B1 * | 9/2013 | Daniel et al. ............... 455/575.7 |
| 8,948,889 B2 | 2/2015 | Spears et al. |
| 2002/0008672 A1 | 1/2002 | Gothard et al. |
| 2002/0030566 A1 | 3/2002 | Bozler |
| 2002/0079982 A1 | 6/2002 | Lafleur et al. |
| 2002/0109642 A1 | 8/2002 | Gee et al. |
| 2002/0118075 A1 | 8/2002 | Ohwada |
| 2002/0145483 A1 | 10/2002 | Bouisse |
| 2002/0167963 A1 | 11/2002 | Joa-Ng |
| 2002/0183013 A1 | 12/2002 | Auckland et al. |
| 2002/0187780 A1 | 12/2002 | Souissi |
| 2002/0191703 A1 | 12/2002 | Ling |
| 2002/0193088 A1 | 12/2002 | Jung |
| 2003/0060227 A1 | 3/2003 | Sekine |
| 2003/0071300 A1 | 4/2003 | Yashima |
| 2003/0114124 A1 | 6/2003 | Higuchi |
| 2003/0142022 A1 | 7/2003 | Ollikainen |
| 2003/0193997 A1 | 10/2003 | Dent |
| 2003/0199286 A1 | 10/2003 | D du Toit |
| 2003/0210206 A1 | 11/2003 | Phillips |
| 2003/0216150 A1 | 11/2003 | Ueda |
| 2003/0232607 A1 | 12/2003 | Le Bars |
| 2004/0009754 A1 | 1/2004 | Smith |
| 2004/0090372 A1 | 5/2004 | Nallo |
| 2004/0100341 A1 | 5/2004 | Luetzelschwab |
| 2004/0127178 A1 | 7/2004 | Kuffner |
| 2004/0137950 A1 | 7/2004 | Bolin |
| 2004/0202399 A1 | 10/2004 | Kochergin |

(56) References Cited

U.S. PATENT DOCUMENTS

| | | |
|---|---|---|
| 2004/0232982 A1 | 11/2004 | Ichitsubo et al. |
| 2004/0257293 A1 | 12/2004 | Friedrich |
| 2004/0263411 A1 | 12/2004 | Fabrega-Sanchez et al. |
| 2005/0007291 A1 | 1/2005 | Fabrega-Sanchez |
| 2005/0032488 A1 | 2/2005 | Pehlke |
| 2005/0032541 A1 | 2/2005 | Wang |
| 2005/0042994 A1 | 2/2005 | Otaka |
| 2005/0059362 A1 | 3/2005 | Kalajo |
| 2005/0082636 A1 | 4/2005 | Yashima |
| 2005/0085204 A1 | 4/2005 | Poilasne et al. |
| 2005/0093624 A1 | 5/2005 | Forrester et al. |
| 2005/0130608 A1 | 6/2005 | Forse |
| 2005/0130699 A1 | 6/2005 | Kim |
| 2005/0208960 A1 | 9/2005 | Hassan |
| 2005/0215204 A1 | 9/2005 | Wallace |
| 2005/0259011 A1 | 11/2005 | Vance |
| 2005/0264455 A1 | 12/2005 | Talvitie |
| 2005/0280588 A1 | 12/2005 | Fujikawa et al. |
| 2005/0282503 A1 | 12/2005 | Onno |
| 2006/0003537 A1 | 1/2006 | Sinha |
| 2006/0009165 A1 | 1/2006 | Alles |
| 2006/0099915 A1 | 5/2006 | Laroia et al. |
| 2006/0119511 A1 | 6/2006 | Collinson et al. |
| 2006/0160501 A1 | 7/2006 | Mendolia |
| 2006/0183431 A1* | 8/2006 | Chang et al. ............... 455/69 |
| 2006/0183433 A1 | 8/2006 | Mori et al. |
| 2006/0183442 A1 | 8/2006 | Chang et al. |
| 2006/0205368 A1 | 9/2006 | Bustamante |
| 2006/0281423 A1 | 12/2006 | Caimi |
| 2007/0001924 A1 | 1/2007 | Hirabayashi et al. |
| 2007/0013483 A1 | 1/2007 | Stewart |
| 2007/0035458 A1 | 2/2007 | Ohba |
| 2007/0042725 A1 | 2/2007 | Poilasne |
| 2007/0042734 A1 | 2/2007 | Ryu |
| 2007/0063788 A1 | 3/2007 | Zhu |
| 2007/0077956 A1* | 4/2007 | Julian ............... H04W 52/146<br>455/522 |
| 2007/0080888 A1 | 4/2007 | Mohamadi |
| 2007/0082611 A1 | 4/2007 | Terranova et al. |
| 2007/0085609 A1 | 4/2007 | Itkin |
| 2007/0091006 A1 | 4/2007 | Thober et al. |
| 2007/0111681 A1 | 5/2007 | Alberth et al. |
| 2007/0142011 A1 | 6/2007 | Shatara |
| 2007/0142014 A1 | 6/2007 | Wilcox |
| 2007/0149146 A1 | 6/2007 | Hwang |
| 2007/0182636 A1 | 8/2007 | Carlson |
| 2007/0184825 A1 | 8/2007 | Lim et al. |
| 2007/0194859 A1 | 8/2007 | Brobston |
| 2007/0197180 A1 | 8/2007 | McKinzie et al. |
| 2007/0200766 A1 | 8/2007 | McKinzie |
| 2007/0200773 A1 | 8/2007 | Dou et al. |
| 2007/0210899 A1* | 9/2007 | Kato .................. H04B 1/18<br>333/17.3 |
| 2007/0248238 A1 | 10/2007 | Abreu et al. |
| 2007/0285326 A1 | 12/2007 | McKinzie |
| 2007/0293176 A1 | 12/2007 | Yu |
| 2008/0007478 A1 | 1/2008 | Jung |
| 2008/0018541 A1 | 1/2008 | Pang |
| 2008/0051096 A1* | 2/2008 | Rao .................. H04W 52/04<br>455/449 |
| 2008/0055016 A1 | 3/2008 | Morris |
| 2008/0081670 A1 | 4/2008 | Rofougaran |
| 2008/0090539 A1 | 4/2008 | Thompson |
| 2008/0090573 A1* | 4/2008 | Kim .................. H04W 36/08<br>455/436 |
| 2008/0106350 A1 | 5/2008 | McKinzie |
| 2008/0122553 A1 | 5/2008 | McKinzie |
| 2008/0122723 A1 | 5/2008 | Rofougaran |
| 2008/0129612 A1 | 6/2008 | Wang |
| 2008/0158076 A1 | 7/2008 | Walley |
| 2008/0174508 A1 | 7/2008 | Iwai et al. |
| 2008/0261544 A1 | 10/2008 | Blin |
| 2008/0274706 A1 | 11/2008 | Blin |
| 2008/0280570 A1 | 11/2008 | Blin |
| 2008/0300027 A1 | 12/2008 | Dou |
| 2008/0305749 A1 | 12/2008 | Ben-Bassat |
| 2008/0305750 A1 | 12/2008 | Alon et al. |
| 2009/0002077 A1 | 1/2009 | Rohani et al. |
| 2009/0027286 A1 | 1/2009 | Ohishi |
| 2009/0051611 A1 | 2/2009 | Shamblin et al. |
| 2009/0082017 A1 | 3/2009 | Chang et al. |
| 2009/0109880 A1 | 4/2009 | Kim et al. |
| 2009/0121963 A1 | 5/2009 | Greene |
| 2009/0149136 A1 | 6/2009 | Rofougaran |
| 2009/0180403 A1 | 7/2009 | Tudosoiu |
| 2009/0184879 A1 | 7/2009 | Derneryd |
| 2009/0196192 A1* | 8/2009 | Lim .................. H04W 52/247<br>370/252 |
| 2009/0215446 A1 | 8/2009 | Hapsari et al. |
| 2009/0231220 A1 | 9/2009 | Zhang et al. |
| 2009/0253385 A1 | 10/2009 | Dent et al. |
| 2009/0264065 A1 | 10/2009 | Song |
| 2009/0278685 A1 | 11/2009 | Potyrailo |
| 2009/0295651 A1 | 12/2009 | Dou et al. |
| 2009/0323582 A1 | 12/2009 | Proctor et al. |
| 2010/0041348 A1 | 2/2010 | Wilcox et al. |
| 2010/0053009 A1 | 3/2010 | Rofougaran |
| 2010/0060531 A1 | 3/2010 | Rappaport |
| 2010/0073103 A1 | 3/2010 | Spears et al. |
| 2010/0085260 A1 | 4/2010 | McKinzie |
| 2010/0085884 A1 | 4/2010 | Srinivasan et al. |
| 2010/0105425 A1 | 4/2010 | Asokan |
| 2010/0156552 A1 | 6/2010 | McKinzie |
| 2010/0164640 A1 | 7/2010 | McKinzie |
| 2010/0164641 A1 | 7/2010 | McKinzie |
| 2010/0214189 A1 | 8/2010 | Kanazawa |
| 2010/0232474 A1 | 9/2010 | Rofougaran |
| 2010/0244576 A1 | 9/2010 | Hillan et al. |
| 2010/0277363 A1 | 11/2010 | Kainulainen et al. |
| 2010/0285836 A1 | 11/2010 | Horihata et al. |
| 2010/0302106 A1 | 12/2010 | Knudsen et al. |
| 2010/0304688 A1 | 12/2010 | Knudsen |
| 2010/0308933 A1* | 12/2010 | See .................. H03F 1/565<br>333/32 |
| 2011/0002080 A1 | 1/2011 | Ranta |
| 2011/0012790 A1 | 1/2011 | Badaruzzaman |
| 2011/0014879 A1 | 1/2011 | Alberth et al. |
| 2011/0014886 A1 | 1/2011 | Manssen |
| 2011/0043298 A1 | 2/2011 | McKinzie |
| 2011/0053524 A1 | 3/2011 | Manssen |
| 2011/0063042 A1 | 3/2011 | Mendolia |
| 2011/0086600 A1 | 4/2011 | Muhammad |
| 2011/0086630 A1 | 4/2011 | Manssen |
| 2011/0102290 A1 | 5/2011 | Milosavljevic |
| 2011/0105023 A1 | 5/2011 | Scheer et al. |
| 2011/0116395 A1* | 5/2011 | Tsuda .................. H04W 28/18<br>370/252 |
| 2011/0116423 A1 | 5/2011 | Rousu et al. |
| 2011/0117863 A1 | 5/2011 | Camp, Jr. et al. |
| 2011/0117973 A1 | 5/2011 | Asrani et al. |
| 2011/0121079 A1 | 5/2011 | Lawrence et al. |
| 2011/0122040 A1 | 5/2011 | Wakabayashi et al. |
| 2011/0133994 A1 | 6/2011 | Korva |
| 2011/0140982 A1 | 6/2011 | Ozden et al. |
| 2011/0183628 A1 | 7/2011 | Baker |
| 2011/0183633 A1 | 7/2011 | Ohba et al. |
| 2011/0195679 A1 | 8/2011 | Lee et al. |
| 2011/0227666 A1 | 9/2011 | Manssen |
| 2011/0237207 A1 | 9/2011 | Bauder |
| 2011/0250852 A1 | 10/2011 | Greene |
| 2011/0254637 A1 | 10/2011 | Manssen |
| 2011/0254638 A1 | 10/2011 | Manssen |
| 2011/0256857 A1 | 10/2011 | Chen et al. |
| 2011/0281532 A1 | 11/2011 | Shin et al. |
| 2011/0299438 A1 | 12/2011 | Mikhemar |
| 2012/0051409 A1 | 3/2012 | Brobston et al. |
| 2012/0075159 A1 | 3/2012 | Chang |
| 2012/0084537 A1 | 4/2012 | Indukuru et al. |
| 2012/0094708 A1 | 4/2012 | Park |
| 2012/0099462 A1* | 4/2012 | Yuda .................. H04W 24/10<br>370/252 |
| 2012/0100802 A1 | 4/2012 | Mohebbi |
| 2012/0112851 A1 | 5/2012 | Manssen |
| 2012/0112852 A1 | 5/2012 | Manssen et al. |

(56) References Cited

U.S. PATENT DOCUMENTS

| | | |
|---|---|---|
| 2012/0154975 A1 | 6/2012 | Oakes |
| 2012/0214421 A1 | 8/2012 | Hoirup |
| 2012/0220243 A1 | 8/2012 | Mendolia |
| 2012/0243579 A1 | 9/2012 | Premakanthan et al. |
| 2012/0293384 A1 | 11/2012 | Knudsen et al. |
| 2012/0295554 A1 | 11/2012 | Greene et al. |
| 2012/0309332 A1 | 12/2012 | Liao et al. |
| 2013/0005277 A1 | 1/2013 | Klomsdorf et al. |
| 2013/0052967 A1 | 2/2013 | Black et al. |
| 2013/0056841 A1 | 3/2013 | Hsieh et al. |
| 2013/0076579 A1 | 3/2013 | Zhang et al. |
| 2013/0076580 A1 | 3/2013 | Zhang et al. |
| 2013/0122829 A1 | 5/2013 | Hyvonen et al. |
| 2013/0137384 A1 | 5/2013 | Desclos et al. |
| 2013/0154897 A1 | 6/2013 | Sorensen et al. |
| 2013/0182583 A1* | 7/2013 | Siomina ............... H04W 24/10 370/252 |
| 2013/0215846 A1 | 8/2013 | Yerrabommanahalli et al. |
| 2013/0293425 A1 | 11/2013 | Zhu et al. |
| 2013/0315285 A1 | 11/2013 | Black et al. |
| 2014/0002323 A1 | 1/2014 | Ali et al. |
| 2014/0128032 A1* | 5/2014 | Muthukumar ........... H01Q 3/00 455/411 |
| 2016/0241276 A1 | 8/2016 | Zhu |

FOREIGN PATENT DOCUMENTS

| | | |
|---|---|---|
| EM | 0909024 | 4/1999 |
| EP | 0685936 | 6/1995 |
| EP | 0909024 | 4/1999 |
| EP | 1079296 | 2/2001 |
| EP | 1137192 | 9/2001 |
| EP | 1298810 | 4/2006 |
| EP | 2328233 | 6/2011 |
| EP | 2388925 A1 | 11/2011 |
| EP | 2424119 A1 | 2/2012 |
| EP | 3131157 | 2/2017 |
| JP | 03276901 | 3/1990 |
| JP | 02077580 | 9/1991 |
| JP | 9321526 | 12/1997 |
| JP | 10209722 | 8/1998 |
| JP | 2000124066 | 4/2000 |
| KR | 100645526 | 11/2006 |
| KR | 10-0740177 | 7/2007 |
| WO | 2009/064968 | 5/2000 |
| WO | 01/71846 | 9/2001 |
| WO | 2006/031170 | 3/2006 |
| WO | 2008/030165 | 3/2008 |
| WO | 2009/155966 | 12/2009 |
| WO | 2010028521 A1 | 3/2010 |
| WO | 2011/044592 | 4/2011 |
| WO | 2011/084716 | 7/2011 |
| WO | 2011102143 A1 | 8/2011 |
| WO | 2011/133657 | 10/2011 |
| WO | 2011028453 | 10/2011 |
| WO | 2012/067622 | 5/2012 |
| WO | 2012/085932 | 6/2012 |
| WO | 2012085932 A2 | 6/2012 |
| WO | 2011084716 A1 | 7/2014 |

OTHER PUBLICATIONS

Bezooijen, A. et al., "A GSM/EDGE/WCDMA Adaptive Series-LC Matching Network Using RF-MEMS Switches", IEEE Journal of Solid-State Circuits, vol. 43, No. 10, Oct. 2008, 2259-2268.

Du Toit, "Tunable Microwave Devices With Auto Adjusting Matching Circuit", U.S. Appl. No. 13/302,617, filed Nov. 22, 2011.

Du Toit, "Tunable Microwave Devices With Auto-Adjusting Matching Circuit", U.S. Appl. No. 13/302,649, filed Nov. 22, 2011.

Eiji, N., "High-Frequency Circuit and Its Manufacture", Patent Abstracts of Japan, vol. 1998, No. 13, Nov. 30, 1998 & JP 10 209722 A (Seiko Epson Corp), Aug. 7, 1998.

Greene, "Method and Apparatus for Tuning a Communication Device", U.S. Appl. No. 13/108,463, filed May 16, 2011.

Greene, "Method and Apparatus for Tuning a Communication Device", U.S. Appl. No. 13/108,589, filed May 16, 2011.

Hoirup, "Method and Apparatus for Radio Antenna Frequency Tuning", U.S. Appl. No. 13/030,177, filed Feb. 18, 2011.

Huang, Libo et al., "Theoretical and experimental investigation of adaptive antenna impedance matching for multiband mobile phone applications", IEEE, Sep. 7, 2005, 13-17.

Hyun, S. , "Effects of strain on the dielectric properties of tunable dielectric SrTiO3 thin films", Applied Physics Letters, vol. 79, No. 2, Jul. 9, 2001.

Ida, I. et al., "An Adaptive Impedence Matching System and Its Application to Mobile Antennas", TENCON 2004, IEEE Region 10 Conference, See Abstract ad p. 544, Nov. 21-24, 2004, 543-547.

Katsuya, K. , "Hybrid Integrated Circuit Device", Patent Abstracts of Japan, Publication No. 03-276901, Date of publication of application: Sep. 12, 1991.

Manssen, "Method and Apparatus for Managing Interference in a Communication Device", U.S. Appl. No. 61/326,206, filed Apr. 20, 2010.

Manssen, "Method and Apparatus for Tuning Antennas in a Communication Device", U.S. Appl. No. 12/941,972, filed Nov. 8, 2010.

Manssen, "Method and Apparatus for Tuning Antennas in a Communication Device", U.S. Appl. No. 13/005,122, filed Jan. 12, 2011.

McKinzie, "Adaptive Impedance Matching Module (AIMM) Control Architectures", U.S. Appl. No. 13/293,544, filed Nov. 10, 2011.

McKinzie, "Adaptive Impedance Matching Module (AIMM) Control Architectures", U.S. Appl. No. 13/293,550, filed Nov. 10, 2011.

McKinzie, "Method and Apparatus for Adaptive Impedance Matching", U.S. Appl. No. 13/217,748, filed Aug. 25, 2011.

Mendolia, "Method and Apparatus for Tuning a Communication Device", U.S. Appl. No. 13/035,417, filed Feb. 25, 2011.

Paratek Microwave, Inc., "Method and Appartus for Tuning Antennas in a Communication Device", International Application No. PCT/US11/59620; Filed Nov. 7, 2011.

Patent Cooperation Treaty, "International Search Report and Written Opinion", International Application No. PCT/US2010/046241, Mar. 2, 2011.

Patent Cooperation Treaty, "International Search Report and Written Opinion", International Application No. PCT/US2010/056413, Jul. 27, 2011.

Patent Cooperation Treaty, "International Search Report and Written Opinion", Nov. 16, 2011, International Application No. PCT/US/2011/038543.

Patent Cooperation Treaty, "International Search Report and Written Opinion", PCT Application No. PCT/US08/005085, Jul. 2, 2008.

Pervez, N.K., "High Tunability barium strontium titanate thin films for RF circuit applications", Applied Physics Letters, vol. 85, No. 19, Nov. 8, 2004.

Petit, Laurent , "MEMS-Switched Parasitic-Antenna Array for Radiation Pattern Diversity", IEEE Transactions on Antennas and Propagation, vol. 54, No. 9, Sep. 2009, 2624-2631.

Qiao, et al., "Antenna Impedance Mismatch Measurement and Correction for Adaptive COMA Transceivers", IEEE, Jan. 2005.

Qiao, et al., "Measurement of Antenna Load Impedance for Power Amplifiers", The Department of Electrical and Computer Engineering, University of California, San Diego, Sep. 13, 2004.

Spears, "Methods for Tuning an Adaptive Impedance Matching Network With a Look-Up Table", U.S. Appl. No. 13/297,95, filed Nov. 16, 2011.

Stemmer, Susanne , "Low-loss tunable capacitors fabricated directly on gold bottom electrodes", Applied Physics Letters 88, 112905, Mar. 15, 2006.

Taylor, T.R. , "Impact of thermal strain on the dielectric constant of sputtered barium strontium titanate thin films", Applied Physics Letters, vol. 80, No. 11, Mar. 18, 2002.

Tombak, Ali , "Tunable Barium Strontium Titanate Thin Film Capacitors for RF and Microwave Applications", IEEE Microwave and Wireles Components Letters, vol. 12, Jan. 2002.

Xu, Hongtao , "Tunable Microwave Integrated Circuits using BST Thin Film Capacitors with Device", Integrated Ferroelectrics,

(56) References Cited

OTHER PUBLICATIONS

Department of Electrical Engineering and Computer Engineering, University of California, 2005, Apr. 2005.
Zuo, S., "Eigenmode Decoupling for Mimo Loop-Antenna Based on 180 Coupler", Progress in Electromagnetics Research Letters, vol. 26, Aug. 2011, 11-20.
Canadian Office Action, Application No. 2,821,173, Oct. 17, 2016.
EPO, "Extended European Search Report, EP16188956.3,", Jan. 9, 2017, 1-9.

* cited by examiner

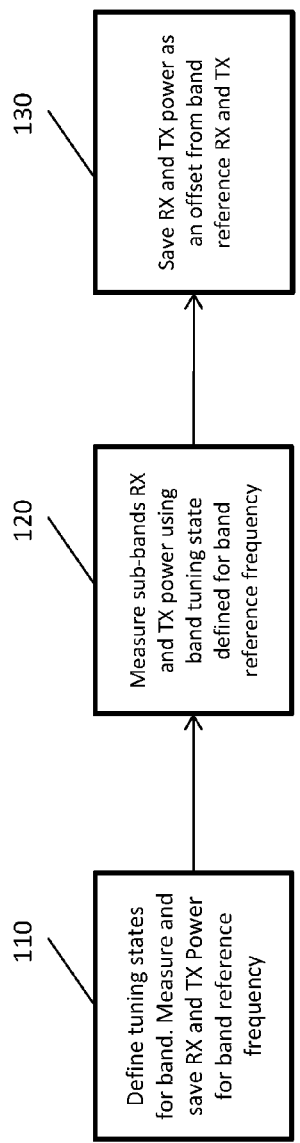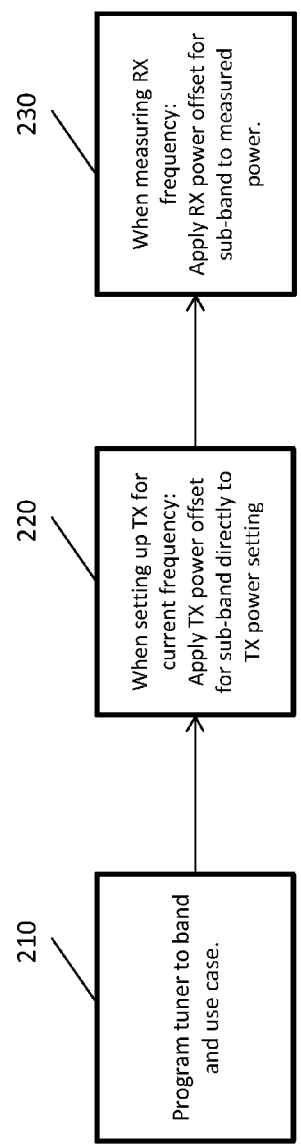

300

400

US 9,769,826 B2

METHOD AND APPARATUS FOR BAND TUNING IN A COMMUNICATION DEVICE

CROSS-REFERENCE TO RELATED APPLICATIONS

This application claims priority to and is a National Stage entry of International Application Number PCT/US2012/049723, filed Aug. 6, 2012, which claims priority to U.S. Provisional Patent Application Ser. No. 61/515,424 filed on Aug. 5, 2011, the disclosures of all of which are hereby incorporated by reference in their entirety.

FIELD OF THE DISCLOSURE

The present disclosure relates generally to communication systems, and more specifically to a method and apparatus for tuning of communication devices.

BACKGROUND

When tuning is implemented in a cellular handset, it is at times not possible or otherwise difficult to achieve an ideal or desired solution due to different constraints in the realization of the tuning control in the handset. These constraints can be due to a number of factors such as real-time constraints in the handset software making it difficult to program the tuner with correct timing, programming interface for the tuner cannot be operated to achieve proper timing for the tuner, and/or frequency, channel, or sub-band information not being available in real-time to the tuning control software. The end result can be that the tuner is unable to be adequately synchronized with all transmit, receive, time slot, and/or frequency change events that occur in the RF.

BRIEF DESCRIPTION OF THE DRAWINGS

FIG. 1 depicts an illustrative embodiment of a process for determining power offsets for a communication device;

FIG. 2 depicts an illustrative embodiment of a process that can be used with the process of FIG. 1 for adjusting power levels of the communication device;

DETAILED DESCRIPTION

Figure 3:
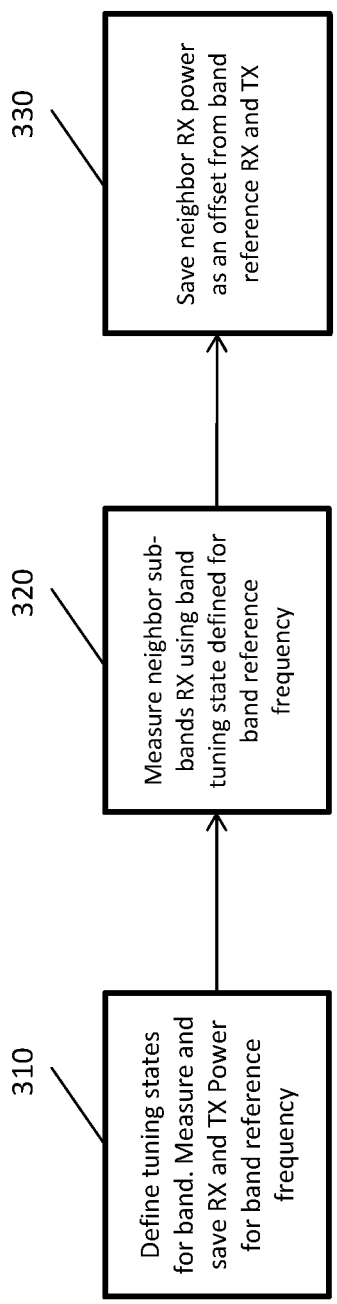
FIG. 3 depicts an illustrative embodiment of a process for determining power offsets associated with a neighboring cell(s)

Radio band information is generally available or otherwise retrievable in communication devices, which provides the broadest definition of where in the spectrum the handset is operating (e.g., transmitting). In communication systems (e.g., cellular systems), frequencies are commonly allocated for usage in a block or range of frequencies. This block or range of frequencies is commonly known as a radio band. Multiple radio bands can be present in any given cellular system, and in any geographic location there can be multiple cellular systems present.

A radio channel identifies a discrete set of frequencies in a cellular system that contains the downlink (from base station to the handset) and uplink (from handset to base station) radio signals. Downlink is also referred to as Rx and uplink is also referred to as Tx. In most systems, such as Wideband Code Division Multiple Access (WCDMA), uplink and downlink use separate frequencies that are separated by the duplex distance, which is the number of Hz separating the uplink and downlink paths. For other systems, such as Time Division Long Term Evolution (TD-LTE), the uplink and downlink use the same frequency.

One or more of the exemplary embodiments can utilize radio band information, including only radio band information in some embodiments, for antenna tuning. The exemplary embodiments can apply to various types of communication devices, including wireless handsets operating utilizing one or more of various communication protocols.

RF tuning based on limited information, such as only the radio band, can create a number of problems. In an ideal cellular system that employs RF tuning, the tuner would be set to match every frequency on which the radio receives or transmits, with the understanding that typically a single antenna is used for both Rx and Tx which requires the RF tuner to change tuning state as the RF signal on the antenna changes frequency. For half-duplex systems, such as GSM that would be for every Rx and Tx, including neighbor cells. In full-duplex systems, such as WCDMA where both Rx and Tx are present concurrently, the RF tuner has to change when the frequency changes for handoffs and neighbor cell monitoring, and additionally the tuning state has to be a duplex setting for Rx and Tx on a frequency between the Rx and Tx frequencies. Similar principles can be applied to other existing wireless access technologies (e.g., UMTS, etc.) as well as future generation access technologies.

In order to perform RF tuning in such an ideal system, the entity controlling the tuner could require exact knowledge in real time of all relevant information pertaining to operating the tuner, such as the radio timing, radio band, radio channel, RF duplex information, and transmit state. Tuning based on limited information occurs when the entity controlling the tuner does not have all the information required to set the RF tuner to match an exact frequency at a given time. For example, real time channel information could be missing, in which case the tuner control entity could set the RF tuner based on information pertaining to the Radio Band only.

Transmit (Tx) and Receive (Rx) operations often cannot or are not tuned in real-time. This can result in or necessitate a broader duplex type tuning. Duplex tuning refers to where the tunable element for a particular sub-band or radio channel is tuned to a frequency between uplink and downlink; one tuning state can be used for both Rx and Tx in this case. In some systems that are full-duplex (concurrent uplink and downlink, such as WCDMA), duplex tuning is commonly used. Other systems that are half-duplex (uplink and downlink are not concurrent, such as GSM), the tuner can be tuned for both Rx and Tx.

Sub-band describes a grouping of frequencies (e.g., radio channels) consisting of one or more radio channels. In tuning applications, sub-dividing a radio band into multiple sub-bands can provide the advantage of being able to apply a particular tuning state to a small or smaller range of radio channels. Sub-bands can be used in conjunction with storage and application of calibration data in cellular handsets, providing a compromise between accuracy and amount of storage needed to hold said calibration data.

An example of a radio band is the GSM 900 band, in which the uplink frequencies can occupy the range 880.0 to 915.0 MHz and the downlink frequencies can occupy the range 925.0 to 960.0 MHz. The duplex spacing can be 45 MHz. The first channel can be channel 975 which has uplink at 880.2 MHz and downlink at 915.2 MHz. The last channel can be channel 124 which has uplink at 914.8 MHz and downlink at 959.8 MHz.

The GSM 900 band can, for example, be subdivided into 3 sub bands as follows: Sub band 1 ranging from channel 975 to channel 1023 (48 channels, 9.6 MHz wide), Sub Band 2 ranging from channel 0 to channel 66 (66 channels, 13.2 MHz wide), and sub band 3 ranging from channel 67 to channel 124 (57 channels, 11.4 MHz wide). This is an example of a radio band and sub-bands, and the present disclosure can include various configurations of radio bands and sub-bands.

In one exemplary embodiment, duplex tuning can be provided for all types of radio access technologies. Without channel or sub-band information, tuning may not be done on smaller frequency ranges than a radio band. Measurements at frequencies far from the center of the tuning band need to be corrected for the frequency response of the tuning network. These measurements may exhibit lower RF power levels, i.e., values that are erroneously low (as compared to error-free values) due to the frequency response of the communication device.

Neighbor cells may or may not be in the radio band but since the radio band only refers to where the handset is transmitting, tuning may not be done specifically to the neighbor. Neighbor cells may, when measured by the handset, exhibit lower RF power levels, in particular when the Neighbor channel is in a different radio band than where the handset is transmitting. For the cellular system, this can result in poor handover performance in cell fringe areas negating the positive effect of antenna tuning. As such any RF power level measured on any frequency away from the reference frequency of the tuner will diverge. If the tuner can be tuned to said frequency, it removes the divergence. If the tuner cannot be tuned to said frequency, the measured power will degrade.

In one exemplary embodiment, a method, to be performed by a communication device, can include adjusting a tuning state of a matching network of the communication device. A tuning state is a setting in the RF tuner where the tunable elements are placed in a particular state to match a specific impedance. The tuning state can be adjusted (e.g., via changing of values to match the specific desired impedance).

The method can include selecting a power offset from among a group of power offsets, where the selected power offset is associated with a sub-band of operation of the communication device, and where the group of power offsets is empirical data for power measurements for tuning states at frequencies relative to a reference frequency of a radio band. The method can include adjusting, by the communication device, a value associated with a measured receive power or a transmit power of the communication device based on the selected power offset to generate an offset power value. The offset is a value that is added to or subtracted from another value to produce a result. The adjusting is the act of adding or subtracting.

In one exemplary embodiment, a wireless communication device can include a matching network and a controller coupled with the matching network. The controller can adjust a tuning state of the matching network. The controller can select a power offset from among a group of power offsets, where the selected power offset is associated with a sub-band of operation of the wireless communication device, and where the group of power offsets is empirical data for power measurements for tuning states at frequencies relative to a reference frequency of a radio band. The controller can adjust a value associated with a measured receive power or a transmit power of the wireless communication device based on the selected power offset to generate an offset power value.

In one exemplary embodiment, a non-transitory computer-readable storage medium includes computer instructions which, responsive to being executed by a processor of a communication device, cause the processor to perform operations comprising adjusting a tuning state of a matching network of the communication device. The computer instructions enable selecting a power offset from among a group of power offsets, where the selected power offset is associated with a sub-band of operation of the communication device, and where the group of power offsets is empirical data for power measurements for tuning states at frequencies relative to a reference frequency of a radio band. The computer instructions enable adjusting a value associated with a measured receive power or a transmit power of the communication device based on the selected power offset to generate an offset power value.

Referring generally to FIGS. 1 and 2, a set of offsets can be created for Tx and Rx power for any frequency relative to the chosen reference frequency in the band. The offsets can be established via measurements. The power offsets can be empirical data for power measurements for tuning states at frequencies relative to a reference frequency of a radio band. The empirical data can be based on measured receive and transmit powers for different tuning states of the matching network for the reference frequency of the radio band and is based on measured receive and transmit powers for the different tuning states of the matching network for sub-band frequencies of the radio band.

The empirical data can also be done for various use cases and/or each use case. The use case can be of various types such as one or more of antenna position, slider position, hands-free operation, speaker-phone mode, location of device, flip open state, slider out state, hand-held operation state, ear-piece speaker operation state, or a speaker-phone operation state.

In the handset, during normal operation, the Tx power offset and Rx power offsets can be added to the actual Tx power or actual measured Rx power compensate for the degradation away from the band reference frequency. Use cases can be applied so that each band has a separate set of offsets for each use case.

Method 100 is a process that can be utilized for gathering the empirical data that enables offsetting measured receive power and/or transmit power during operation of a communication device based on indexing of sub-band frequencies. In step 110, tuning states of a variable matching network can be defined or otherwise implemented and Rx and Tx power can be measured for a reference frequency of a radio band. In step 120, Rx and Tx power can be measured for each of the sub-bands utilizing the defined tuning states for the band reference frequency. In step 130, the Rx and Tx power empirical data can be stored as an offset from the band reference frequency Rx and Tx power gathered in step 110. This process can be repeated for various radio bands and each of the sub-bands of each of the radio bands. As described elsewhere herein, the offset empirical data can be stored in a communication device for use during operation of the communication device, such as being stored in a look-up table accessible by a controller or processor of the communication device.

Method 200 is a process for adjusting power levels of a communication device that can be performed by the communication device. In step 210, the communication device can perform tuning of a matching network that has one or more variable reactance elements. For instance, the adjustment of the tuning state of the matching network can be based on various factors, including one or both of the radio band that the communication device is operating in and a use case(s) for the communication device. The term use case is used to distinguish different antenna impedances that arise from external loading of the antenna, for example placing a hand over the antenna would be referred to as "Hand Use Case." There are many possible use cases including one or more of antenna position, slider position, hands-free operation, speaker-phone mode, location of device, flip open state, slider out state, hand-held operation state, ear-piece speaker operation state, or a speaker-phone operation state.

The tuning of the matching network can be performed using various techniques and components. For instance, the matching network can include one or more variable reactance elements, such as a voltage tunable dielectric capacitor, a semiconductor varactor, a micro-electro-mechanical systems (MEMS) varactor, a semiconductor switched capacitor, and/or a MEMS switched capacitor. These elements can be adjusted by the communication device, such as in a closed-loop feedback process and/or an open-loop feedback process. The feedback can include the factors described above (e.g., radio band and/or use case(s)) and/or other factors, including performance parameters of the communication device, such as transmit linearity, power amplifier efficiency, receive sensitivity, uplink or downlink throughput, total radiated power and/or total isotropic sensitivity.

In step 220, in association with Tx operation, the Tx power offset can be selected or retrieved from a group of power offsets (e.g., stored in a look-up table) based on the sub-band frequency at which the communication device is operating. The selected Tx power offset can be applied to the Tx power setting to generate a modified or offset Tx power setting. In step 230, in association with Rx operation, the Rx power offset can be selected or retrieved from the group of power offsets (e.g., stored in a look-up table) based on the sub-band frequency at which the communication device is operating. The selected Rx power offset can be applied to the measured Rx power to generate a modified or offset Rx power level.

The following is an example illustrating the application of the offsets during operation of the communication device whereby the Tx power offset is, if intended, applied to the output power level, and the Rx power offset is applied to the measured receive power level. During Rx mode, we can assume that due to a tuner being tuned to an alternate frequency than the Rx reference frequency, then the received power measured on the Rx frequency is Pin and the loss in the tuner is Ploss. In this situation, the actual input power is Pinact, such that Pin=Pinact−Ploss. To obtain a power measurement in proximity to the actual input power, the selected Rx power offset for the Rx frequency (Prxo) can be applied to the measured receive power value to generate a measurement close to the actual input power such that the measured power Pin=Pinact−Ploss+Prxo. If Prxo=Ploss then Pin=Pinact.

In this same example during Tx mode, we can assume that due to the tuner being tuned to an alternate frequency than the Tx reference frequency then the intended output power setting on the Tx frequency is Pout and the loss in the tuner is Ploss. The resulting actual output power Ptx=Pout−Ploss. Pout is the setting that is programmed in to the power amplifier of the communication device. The selected Tx power offset stored for the Tx frequency (Ptxo) can be applied to Pout resulting in a new output power setting Poutxo=Pout+Ptxo. The power amplifier can then be programmed to or implemented with Poutxo, such that the actual output power Ptx=Poutxo−Ploss=Pout+Ptxo−Ploss. In the case where Ptxo=Ploss then Ptx=Pout.

Other factors can be utilized in generating the modified or offset measured receive power or transmit power levels so as to more closely approximate actual receive or transmit power.

Figure 4:
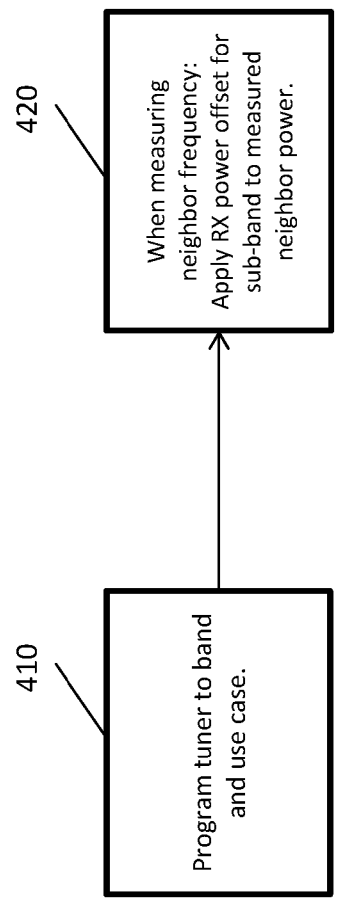
FIG. 4 depicts an illustrative embodiment of a process that can be used with the process of FIG. 3 for adjusting power levels of the communication device.

Referring generally to FIGS. 3 and 4, a set of offsets can be created for the frequencies in each band (e.g., sub-bands) as well as neighbor cell(s) (e.g., neighbor sub-bands) relative to the chosen reference frequency in each band. Neighbor cells generally refer to frequencies in radio bands other than the band containing the reference frequency. A sub-band can refer to a single frequency or a set of frequencies within the radio band. The offsets can be created via measurements. This can also be done for each use case. In the handset, during normal operation, the neighbor power offsets and sub-band offsets can be added to compensate for the degradation away from the band reference frequency. Use cases can be applied so that each band has a separate set of offsets for each use case.

Method 300 is a process that can be utilized for gathering the empirical data that enables offsetting measured receive power and/or transmit power during operation of a communication device based on indexing of sub-band frequencies in association with neighboring cells. In step 310, tuning states of a variable matching network can be defined or otherwise implemented and Rx and Tx power can be measured for a reference frequency of a radio band. In step 320, Rx power can be measured for each of the sub-bands of neighboring cells utilizing the defined tuning states for the band reference frequency. In step 330, the Rx power empirical data can be stored as an offset from the band reference frequency Rx and Tx power gathered in step 310. This process can be repeated for various radio bands and each of the neighboring cell sub-bands. As described elsewhere herein, the offset empirical data can be stored in a communication device for use during operation of the communication device, such as being stored in a look-up table accessible by a controller or processor of the communication device, including in conjunction with a handover operation between network cells.

Method 400 is a process for adjusting power levels of a communication device that can be performed by the communication device. In step 410, the communication device can perform tuning of a matching network that has one or more variable reactance elements, including tuning based on various factors, such as one or both of the radio band that the communication device is operating in and a use case(s) for the communication device.

In step 420, in association with Rx operation, the Rx power offset can be selected or retrieved from the group of power offsets (e.g., stored in a look-up table) based on the sub-band frequency at which the communication device is operating. The selected Rx power offset can be applied to the measured Rx power of a neighboring cell to generate a modified or offset Rx power level.

Figure 5:
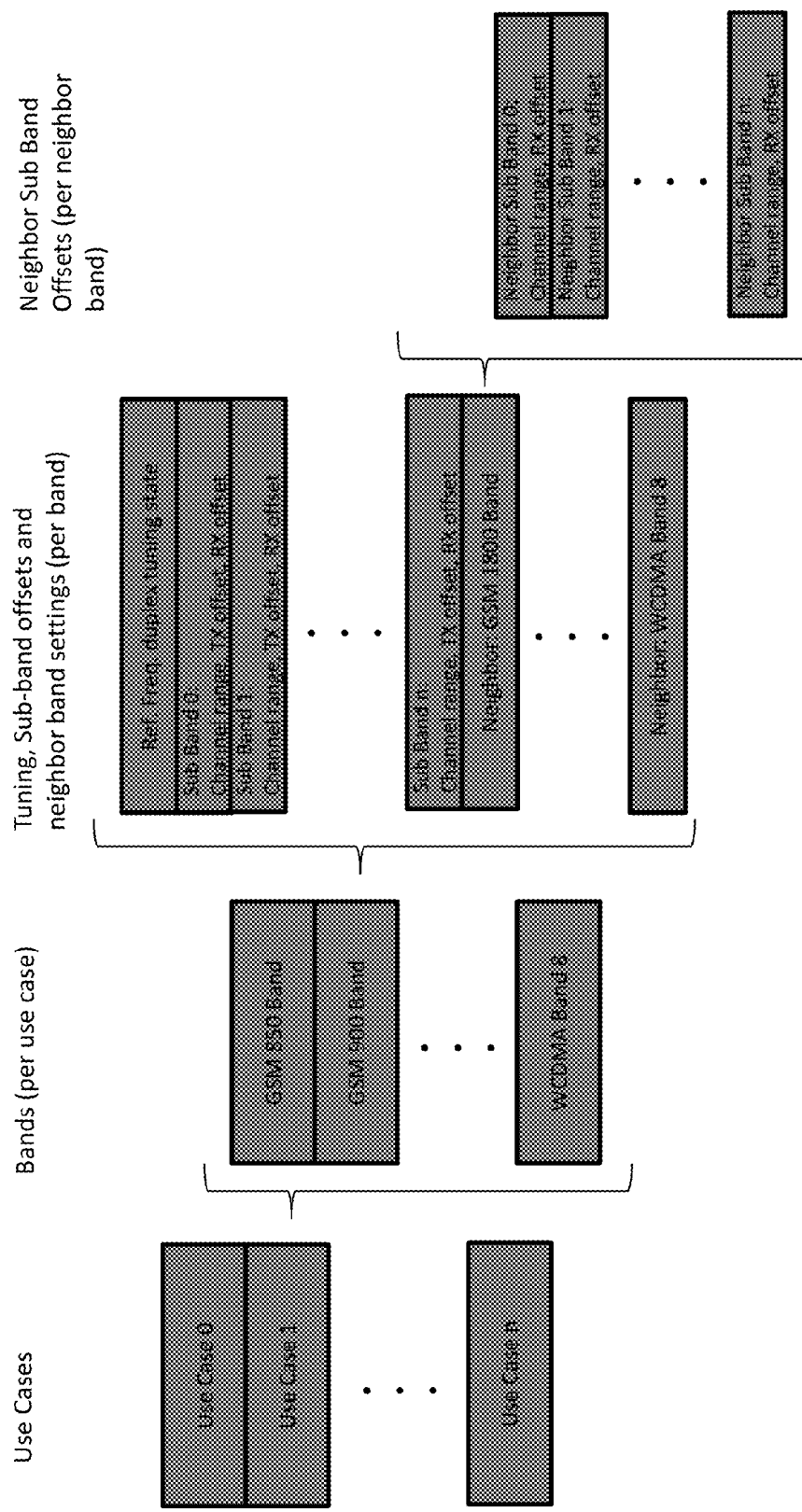
FIG. 5 depicts an illustrative embodiment of a look-up table that can be used by a communication device in accordance with one or more of the processes of FIGS. 1-4.

Referring generally to FIG. 5, a look-up table 500 that can be utilized by a communication device is shown. The look-up table 500 can be stored in a memory of the communication device and accessed during operation (such as a wireless voice communication or wireless data communication) to enable control and adjustment of measured receive power and/or transmit power levels. The look-up table 500, which can be generated according to one or both of methods 100 and 300, can be provisioned into the wireless communication device. The look-up table 500 can include various categorizations for empirical data including use cases and radio bands. The look-up table 500 can also include tuning, sub-band offsets and neighbor band settings, as well as neighbor band offsets. In one embodiment, the offset data can be stored per sub-band to save memory resources of the communication device.

As an example illustrated in FIG. 5, a communication device, in conjunction with a handover operation between a serving cell and a neighboring cell, can utilize a current use case (such as use case 1) and a current radio band of the serving cell (such as Radio Band GSM 900) to index via table 500 to a radio band of the neighboring cell (such as Radio Band GSM 1800) and further index to power offset data associated with a sub-band frequency of the neighboring cell radio band. In this example, the empirical data for the power offsets includes Rx offset data for neighboring cell sub-bands 0-n. The empirical data can be utilized by the communication device for adjusting the measured receive power level and for making radio resource decisions based on the adjusted level and/or providing the adjusted level to a network element which makes a radio resource decision, such as a handover decision.

Figure 6:
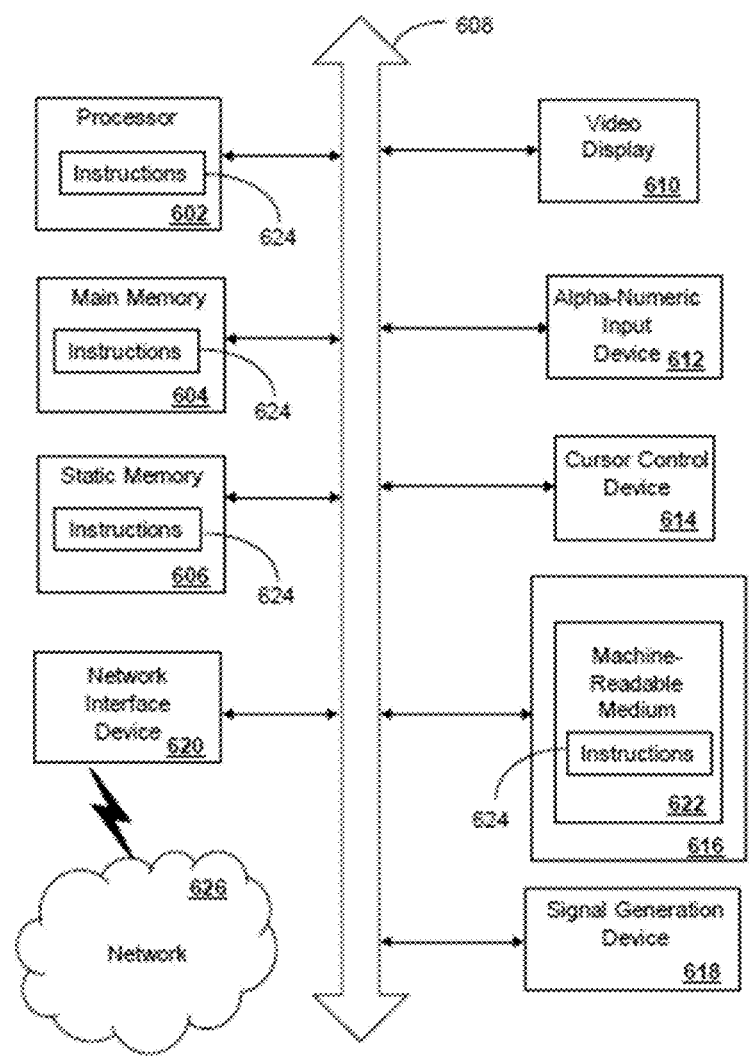
FIG. 6 depicts an exemplary diagrammatic representation of a machine in the form of a computer system within which a set of instructions, when executed, may cause the machine to perform any one or more of the methodologies disclosed herein.

FIG. 6 depicts an exemplary diagrammatic representation of a machine in the form of a computer system 600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine can be representative of communication device 1100 or a portion thereof.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Figure 7:
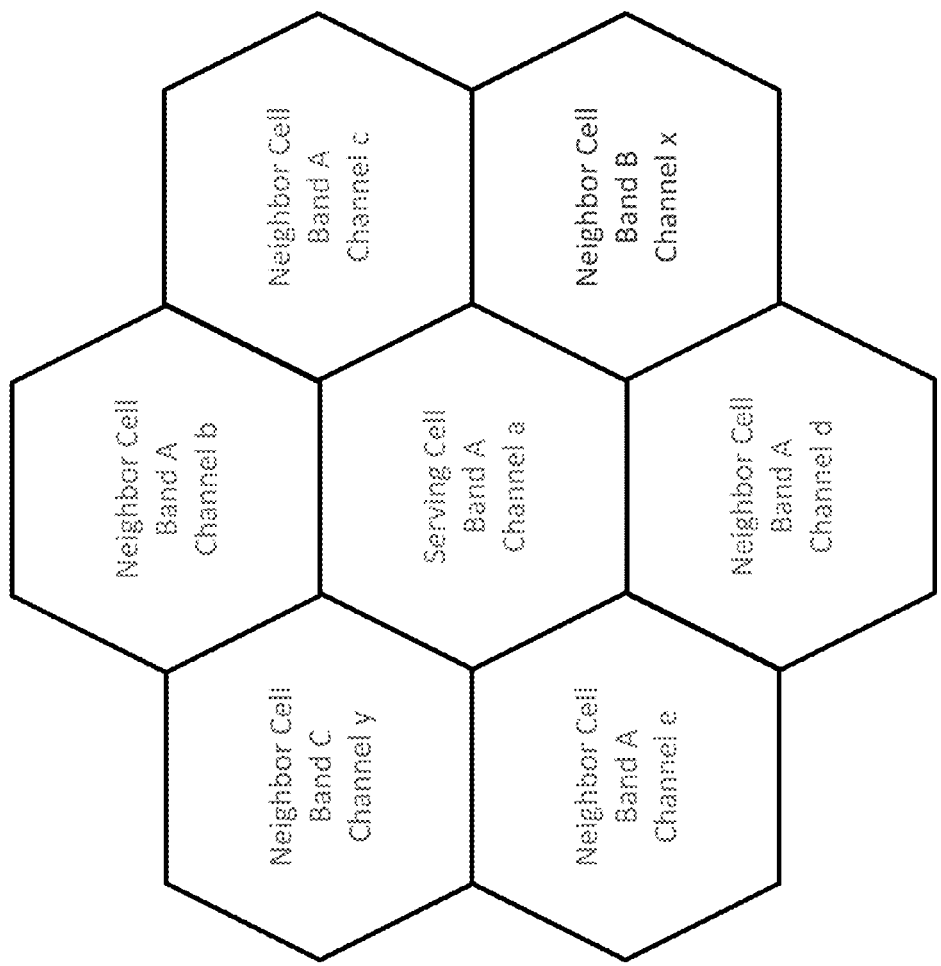
FIG. 7 illustrates a coverage area for a wireless communication device including serving and neighbor cells.
Figure 8:
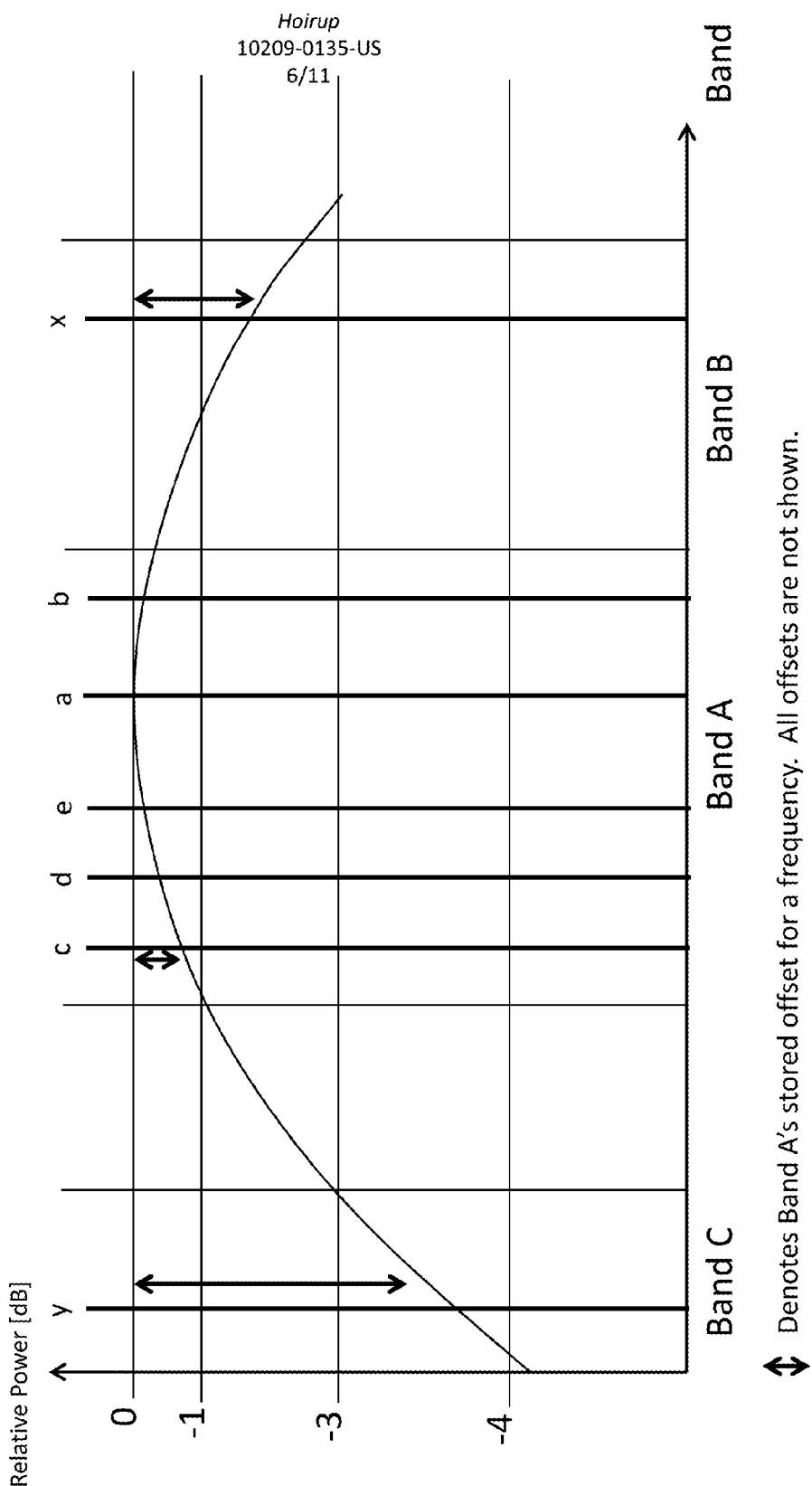
FIGS. 8-10 illustrate power versus frequency data for various tuning schemes.
Figure 9:
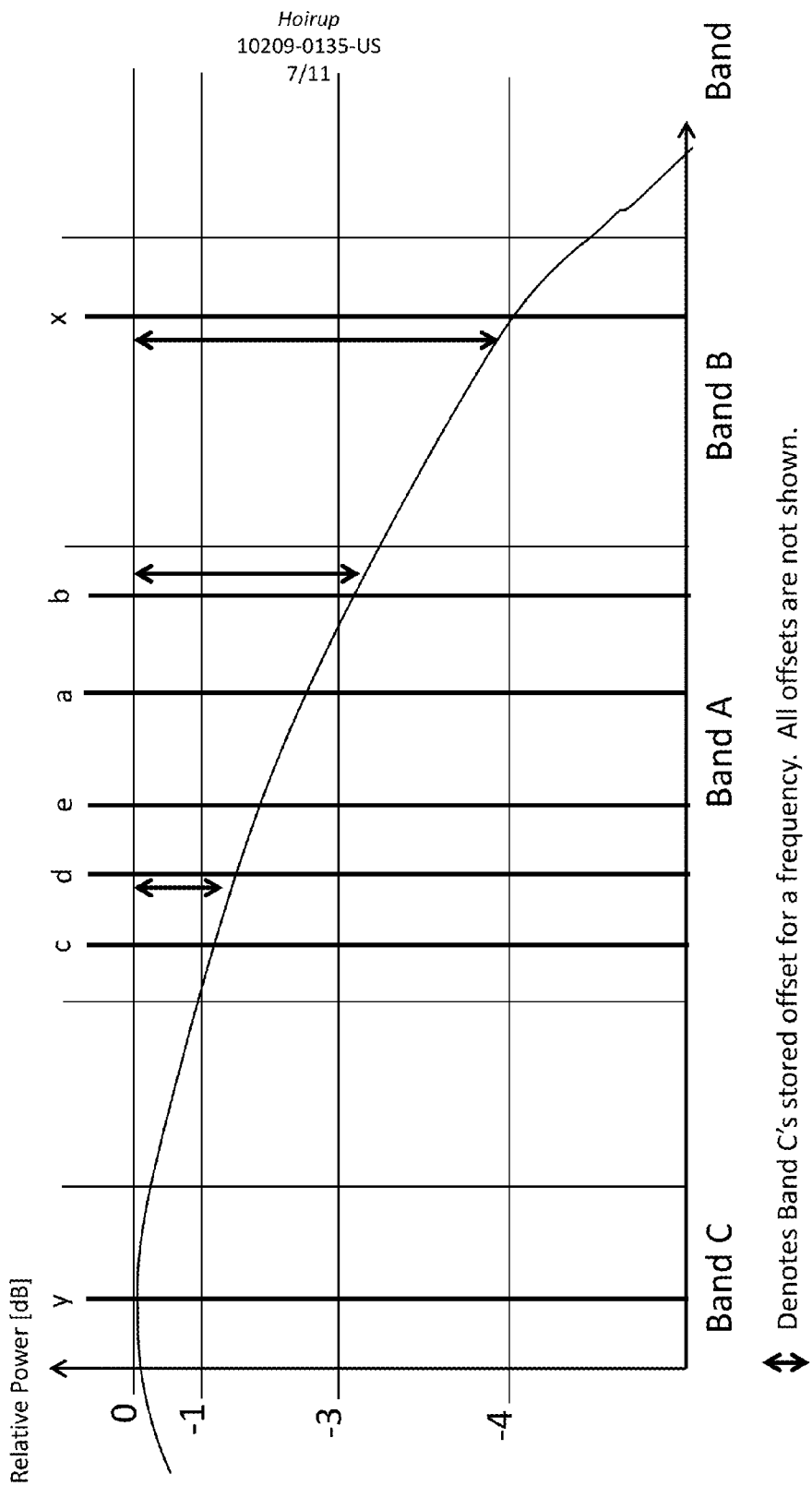

Referring to FIG. 7, a coverage area for a wireless communication device is illustrated in which there is a serving cell and multiple neighboring cells that operate according to various radio bands and channels. In FIG. 8, relative power (depicted in –dB) is illustrated when the tuner of the communication device is set at channel a of radio band A (serving cell of FIG. 7). In FIG. 9, relative power (depicted in –dB) is illustrated when the tuner of the communication device is set at channel y of radio band C (neighbor cell of FIG. 7). As FIGS. 8-9 illustrate, tuning to the serving cell only and not to neighbor cells can result in undesired conditions, including call drops and reduced data rates.

Figure 10:
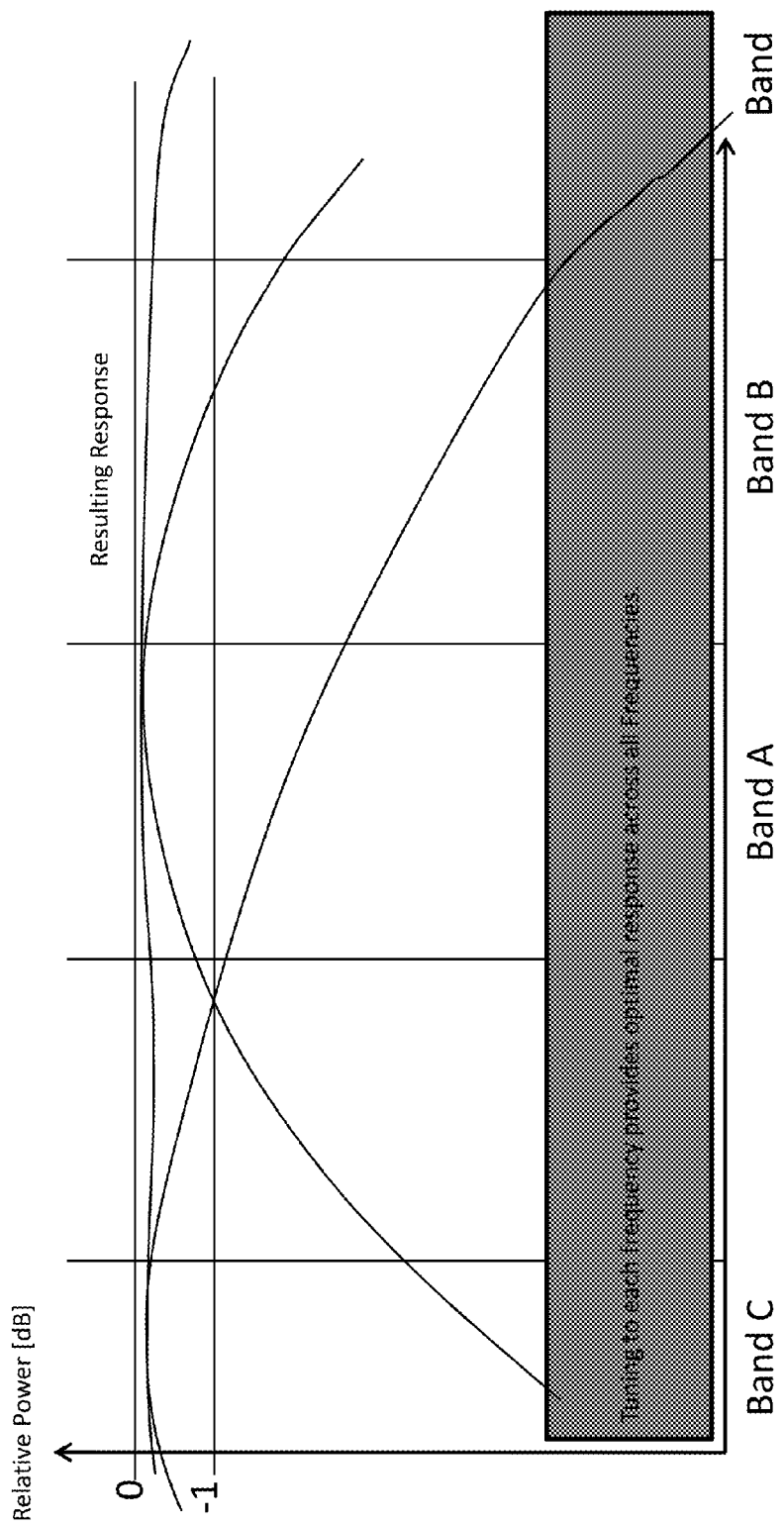

FIG. 10 illustrates relative power (depicted in –dB) when the tuner of the communication device is tuned to each of the corresponding frequencies. By tuning to the neighboring cells as well, the communication device can avoid a neighbor signal strength being perceived lower than nominal strength which would cause the communication device to report too low neighbors to the network and which would cause network to delay handover command to the communication device until reported neighbor strength is above handover threshold. By including the neighboring cells as a factor in the tuning of the matching network, the communication device can avoid a delayed handover. Avoiding a delayed handover can be beneficial as it may force the communication device to use a serving channel for a longer than desired time period at lower signal quality levels, which would reduce the data rate to maintain the link margin. As shown in FIG. 10, the Resulting Response is the peak relative power as the tuning frequency is swept through the radio band(s).

Figure 11:
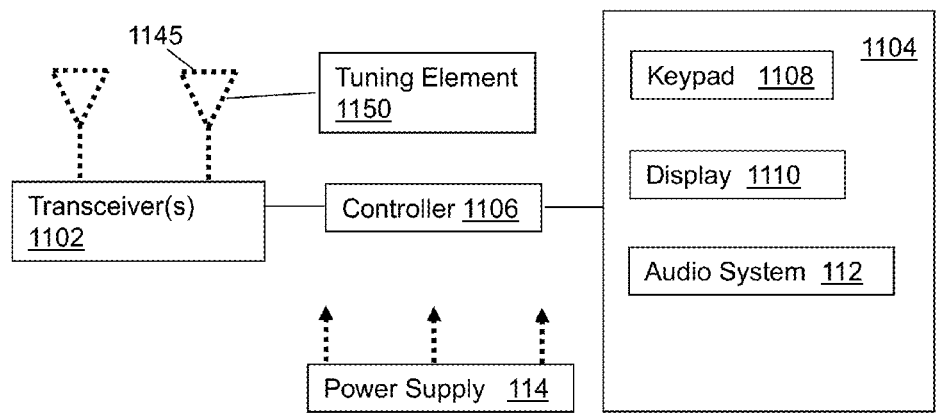
FIG. 11 depicts an illustrative embodiment of a communication device.

FIG. 11 depicts an exemplary embodiment of a communication device 1100 which can implement the power level adjustments via empirical offset data as described with respect to FIGS. 1-10. The communication device 1100 can comprise a wireless transceiver 1102 (herein having independent transmit and receive sections and having one or more antennas 1145 (two of which are shown in this example)), a user interface (UI) 1104, a power supply 1114, and a controller 1106 for managing operations thereof. The wireless transceiver 1102 can utilize short-range or long-range wireless access technologies such as Bluetooth, WiFi, Digital Enhanced Cordless Telecommunications (DECT), or cellular communication technologies, just to mention a few. Cellular technologies can include, for example, CDMA-1X, WCDMA, UMTS/HSDPA, GSM/GPRS, TDMA/EDGE, EV/DO, WiMAX, and next generation cellular wireless communication technologies as they arise.

The UI 1104 can include a depressible or touch-sensitive keypad 1108 with a navigation mechanism such as a roller ball, joystick, mouse, or navigation disk for manipulating operations of the communication device 1100. The keypad 1108 can be an integral part of a housing assembly of the communication device 1100 or an independent device operably coupled thereto by a tethered wireline interface (such as a flex cable) or a wireless interface supporting for example Bluetooth. The keypad 1108 can represent a numeric dialing keypad commonly used by phones, and/or a Qwerty keypad with alphanumeric keys. The UI 1104 can further include a display 1110 such as monochrome or color LCD (Liquid Crystal Display), OLED (Organic Light Emitting Diode) or other suitable display technology for conveying images to an end user of the communication device 1100. In an embodiment where the display 1110 is a touch-sensitive display, a portion or all of the keypad 1108 can be presented by way of the display.

The power supply 1114 can utilize common power management technologies (such as replaceable batteries, supply regulation technologies, and charging system technologies) for supplying energy to the components of the communication device 1100 to facilitate portable applications. The controller 1106 can utilize computing technologies such as a microprocessor and/or digital signal processor (DSP) with associated storage memory such a Flash, ROM, RAM, SRAM, DRAM or other like technologies.

The communication device 1100 can utilize an on-antenna tuning element 1150 (and/or an independent matching network), which can be directly connected with the radiating element(s), including high band (HB) and low band (LB) radiating elements and/or a portion of the radiating elements. Tuning elements can be a number of components in a number of different configurations, including variable capacitors such as electrically tunable capacitors, although other tunable elements are also contemplated by the present disclosure including a semiconductor varactor, a micro-electro-mechanical systems (MEMS) varactor, a MEMS switched reactive element, a piezoelectric component or a semiconductor switched reactive element.

Figure 12:
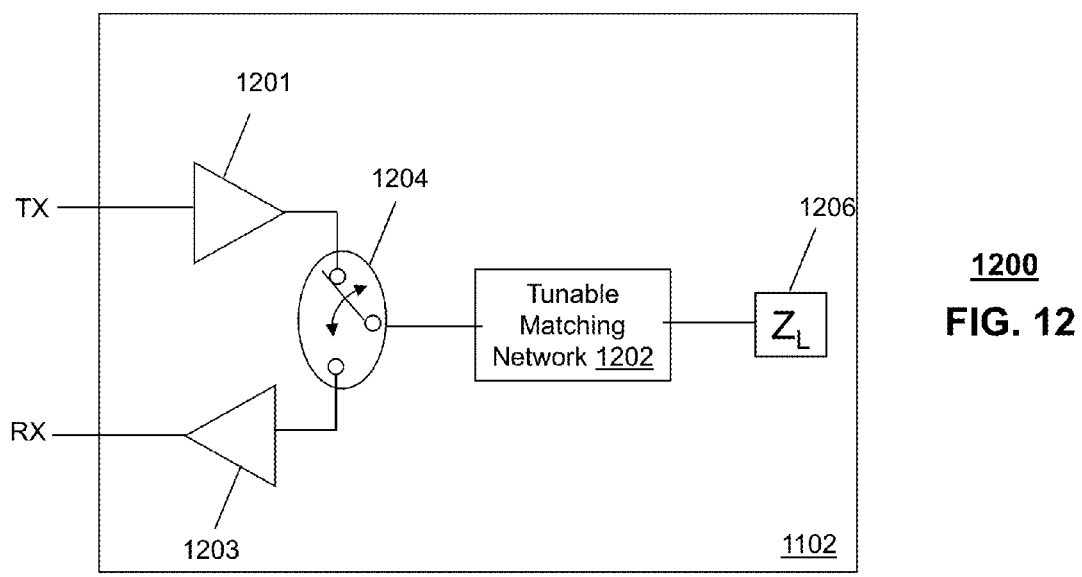
FIG. 12 depicts an illustrative embodiment of a portion of a transceiver of the communication device of FIG. 11.

FIG. 12 depicts an illustrative embodiment of a portion of the wireless transceiver 1102 of the communication device 1100 of FIG. 11. In GSM applications, the transmit and receive portions of the transceiver 1102 can include common amplifiers 1201, 1203 coupled to a tunable matching network 1202 and an impedance load 1206 by way of a switch 1204. The load 1206 in the present illustration can be an antenna as shown in FIG. 11 (herein antenna 1206). A transmit signal in the form of a radio frequency (RF) signal (Tx) can be directed to the amplifier 1201 which amplifies the signal and directs the amplified signal to the antenna 1206 by way of the tunable matching network 1202 when switch 1204 is enabled for a transmission session. The receive portion of the transceiver 1102 can utilize a pre-amplifier 1203 which amplifies signals received from the antenna 1206 by way of the tunable matching network 1202 when switch 1204 is enabled for a receive session. Other configurations of FIG. 12 are possible for other types of cellular access technologies such as CDMA. These undisclosed configurations are contemplated by the present disclosure. As explained above, the transmit power can be amplified based on the modified offset value which is determined based on empirical data such as included in look-up table 500.

Figure 13:
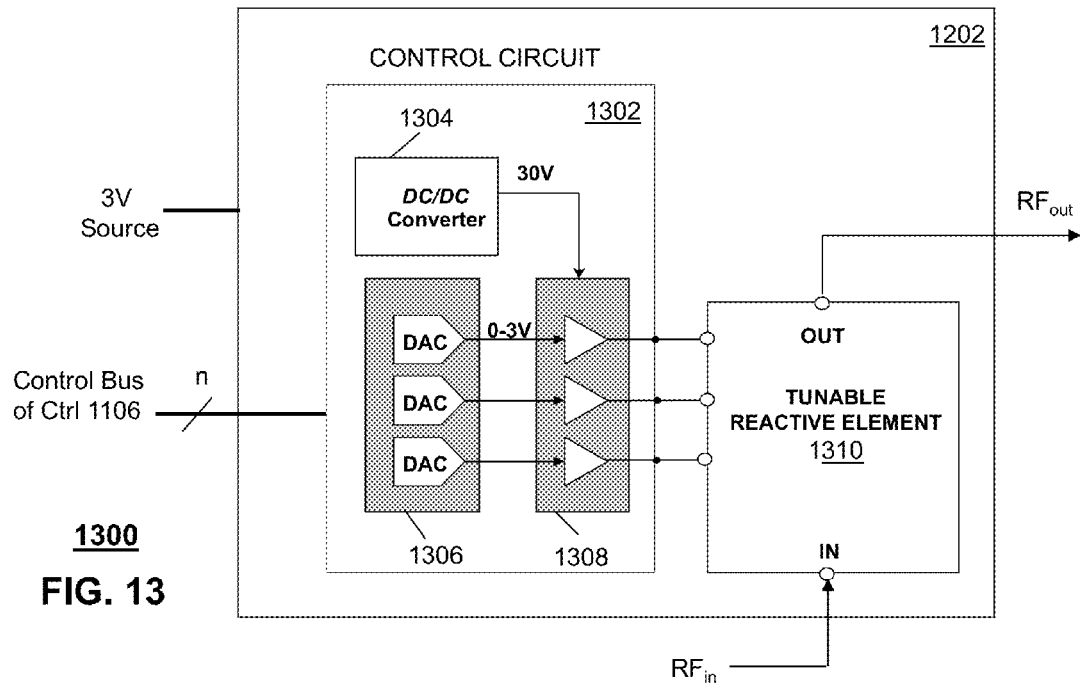
FIGS. 13-14 depict illustrative embodiments of a tunable matching network of the transceiver of FIG. 12.
Figure 14:
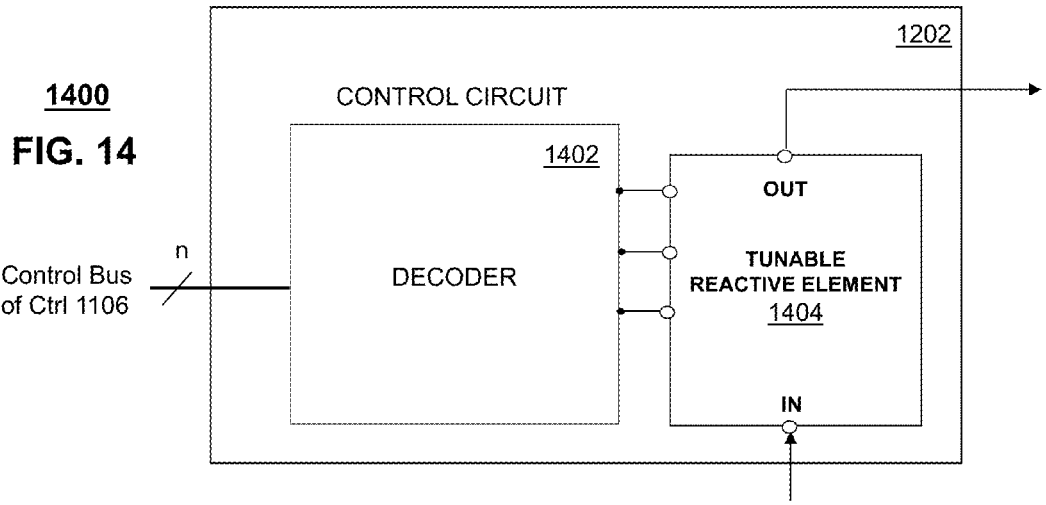
Figure 15:
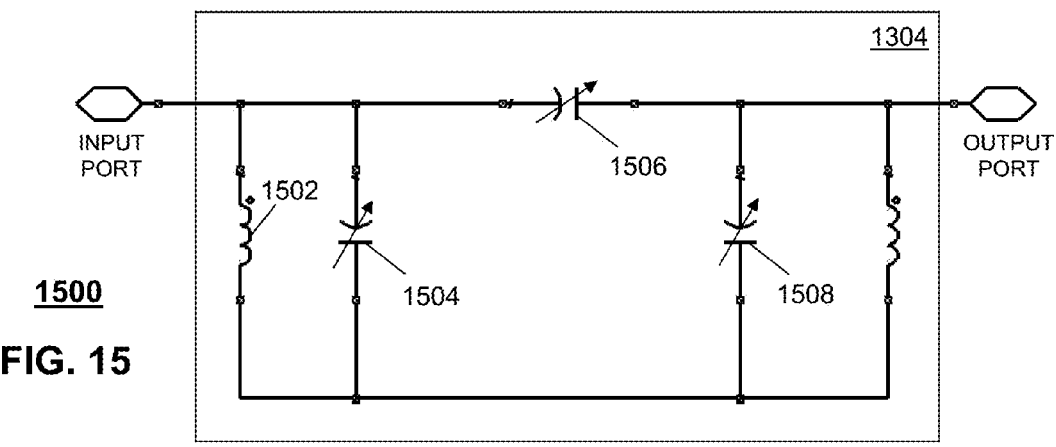
FIGS. 15-16 depict illustrative embodiments of a tunable reactive element of the tunable matching network.

FIGS. 13-14 depict illustrative embodiments of the tunable matching network 1202 of the transceiver 1102 of FIG. 12. In one embodiment, the tunable matching network 1202 can comprise a control circuit 1302 and a tunable reactive element 1310. The control circuit 1302 can comprise a DC-to-DC converter 1304, one or more digital to analog converters (DACs) 1306 and one or more corresponding buffers 1308 to amplify the voltage generated by each DAC. The amplified signal can be fed to one or more tunable reactive components 1504, 1506 and 1508 such as shown in FIG. 15, which depicts a possible circuit configuration for the tunable reactive element 1310. In this illustration, the tunable reactive element 1310 includes three tunable capacitors 1504-1508 and an inductor 1502 with a fixed inductance. Other circuit configurations are possible, and thereby contemplated by the present disclosure.

The tunable capacitors 1504-1508 can each utilize technology that enables tunability of the capacitance of said component. One embodiment of the tunable capacitors 1504-1508 can utilize voltage or current tunable dielectric materials such as a composition of barium strontium titanate (BST). An illustration of a BST composition is the Parascan® Tunable Capacitor. In another embodiment, the tunable reactive element 1310 can utilize semiconductor varactors. Other present or next generation methods or material compositions that can support a means for a voltage or current tunable reactive element are contemplated by the present disclosure.

The DC-to-DC converter 1304 can receive a power signal such as 3 Volts from the power supply 1114 of the communication device 1100 in FIG. 11. The DC-to-DC converter 1304 can use common technology to amplify this power signal to a higher range (e.g., 30 Volts) such as shown. The controller 1106 can supply digital signals to each of the DACs 1306 by way of a control bus of "n" or more wires to individually control the capacitance of tunable capacitors 1504-1508, thereby varying the collective reactance of the tunable matching network 1202. The control bus can be implemented with a two-wire common serial communications technology such as a Serial Peripheral Interface (SPI) bus. With an SPI bus, the controller 1106 can submit serialized digital signals to configure each DAC in FIG. 13 or the switches of the tunable reactive element 1404 of FIG. 14. The control circuit 1302 of FIG. 13 can utilize common digital logic to implement the SPI bus and to direct digital signals supplied by the controller 1106 to the DACs.

Figure 16:
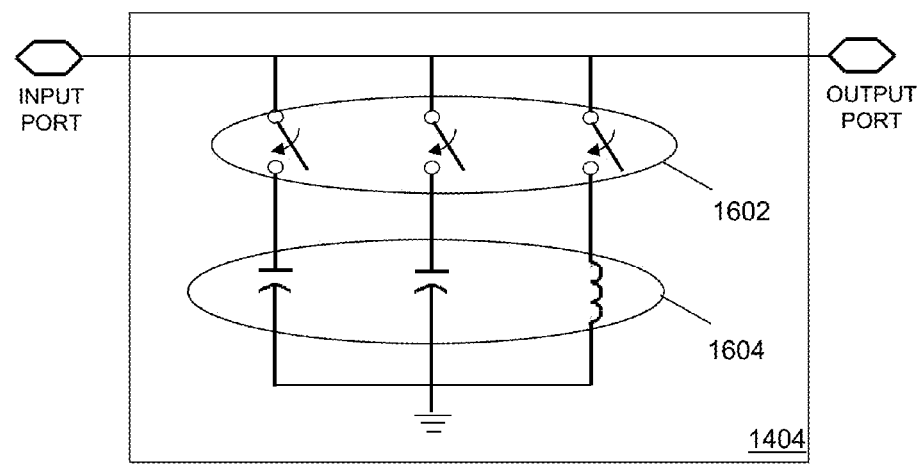

In another embodiment, the tunable matching network 1202 can comprise a control circuit 1402 in the form of a decoder and a tunable reactive element 1404 comprising switchable reactive elements such as shown in FIG. 16. In this embodiment, the controller 1106 can supply the control circuit 1402 signals via the SPI bus which can be decoded with common Boolean or state machine logic to individually enable or disable the switching elements 1602. The switching elements 1602 can be implemented with semiconductor switches or micro-machined switches, such as utilized in micro-electromechanical systems (MEMS). By independently enabling and disabling the reactive elements (capacitor or inductor) of FIG. 16 with the switching elements 1602, the collective reactance of the tunable reactive element 1404 can be varied.

The tunability of the tunable matching networks 1202, 1204 provides the controller 1106 a means to optimize, increase or otherwise adjust (including decreasing in a compromise) performance parameters of the transceiver 1102 such as, for example, but not limited to, transmitter power, transmitter efficiency, receiver sensitivity, power consumption of the communication device, a specific absorption rate (SAR) of energy by a human body, frequency band performance parameters, and so on.

Various tuning techniques can be utilized in the exemplary embodiments in conjunction with the power control techniques described herein. For example, in a time division multiplexed (TDM) system in which the transmitter and the receiver operate at different frequencies but only operate in their respective time slots (i.e., transmit time slot and receive time slot), this can be accomplished by identifying an optimal tuning for the transmitter and then adding an empirically derived adjustment to the tuning circuits in receive mode. As another example, in a frequency division multiplexed (FDM) system in which the transmitter and receiver operate simultaneously and at different frequencies, this can be accomplished by identifying a target operation for the transmitter, and then adjusting the tuning circuits first to the target value for the transmitter and then adjusting the values to approach a compromised value proximate to an equal or desired target value for the receiver. In one embodiment, a predetermined relationship, (e.g., an offset, scaling factor, translation or other change or modification) can be applied to the adjustments of the variable components when switching from the transmit mode to the receive mode. This translation can be a function of the values obtained while adjusting during the transmit time slot. The translation can then be removed upon return to the transmitter mode and the adjustment process is resumed. In one embodiment, because any frequency offset between the transmit signal and the receive signal is known, an adjustment or modification of the setting of the matching network in the form of a translation or some other function can be applied to the matching network during the receive time slot. In another embodiment, the adjustment can be performed in multiple steps if the transmission and reception frequencies are far apart.

In another embodiment and in conjunction with the power control techniques described herein, a Figure of Merit can be utilized that not only incorporates the transmit metrics, but also incorporates an element to attain a compromise between optimal transmitter and optimal receiver operation. This can be accomplished by identifying a target operation goal, such as a desired transmitter and receiver reflection loss and then identifying an operational setting that is a close compromise between the two. This embodiment thus can incorporate not only transmitter metrics but also tuning circuit settings or preferences into the algorithm. The tuning preferences can be empirically identified to ensure the desired operation.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. Portions of the exemplary embodiments can be combined, including combining components from different embodiment and/or combing steps from different methods.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, to be performed by a communication device, comprising:
    adjusting, by the communication device, a tuning state of a matching network of the communication device;
    determining, by the communication device, a use case of the communication device;
    selecting, by the communication device, a power offset from among a group of power offsets according to the use case and according to a sub-band of operation of a neighboring cell for the communication device, the group of power offsets being empirical data for power measurements for tuning states at frequencies relative to a reference frequency of a radio band for a serving cell;
    measuring, by the communication device, a received power of a signal at a neighboring cell frequency received by the communication device from the neighboring cell to determine a measured receive power value;
    determining, by the communication device, an offset power value by adjusting the measured receive power value according to the selected power offset, whereby the matching network is tuned to the reference frequency; and
    transmitting, from the communication device to a network element, the offset power value to cause the network element to make a radio resource decision for the communication device based on the offset power value and not based on the measured receive power value,
    wherein the radio resource decision is a handover decision associated with the neighboring cell, and wherein the decision is based at least in part on whether the offset power value corresponds to a perceived neighbor signal strength above a handover threshold.

2. The method of claim 1, wherein in accordance with the radio resource decision, a handover delay is avoided.

3. The method of claim 1, wherein the adjusting of the tuning state of the matching network is based on a closed-loop process utilizing feedback that includes a power amplifier efficiency.

4. The method of claim 1, wherein the empirical data is based on measured receive power for different tuning states of the matching network for the reference frequency of the radio band and is based on measured receive power for the different tuning states of the matching network for sub-band frequencies of the radio band.

5. The method of claim 1, wherein the group of power offsets are stored in a look-up table of a memory of the communication device.

6. The method of claim 5, wherein the look-up table is categorized by radio bands, sub-bands, neighbor radio bands and neighbor sub-bands.

7. The method of claim 5, wherein the adjusting of the tuning state of the matching network comprises adjusting a reactance of a voltage tunable dielectric capacitor.

8. The method of claim 7, wherein the use case is a physical state of the communication device.

9. The method of claim 1, wherein the adjusting of the tuning state is based on a sub-band of operation of the communication device.

10. The method of claim 1, wherein the adjusting of the tuning state is based on the use case of the communication device.

11. The method of claim 1, wherein the use case corresponds to at least one of a flip open state, a slider out state, a hand's free operation state, a hand-held operation state, an ear-piece speaker operation state, or a speaker-phone operation state.

12. The method of claim 1, wherein the adjusting of the tuning state of the matching network comprises adjusting a reactance of one or more of a semiconductor varactor, a micro-electro-mechanical systems (MEMS) varactor, a semiconductor switched capacitor, or a MEMS switched capacitor.

13. A wireless communication device comprising:
    a matching network; and
    a controller coupled with the matching network, wherein the controller:
        adjusts a tuning state of the matching network;
        selects a power offset from among a group of power offsets according to a sub-band of operation of a neighboring cell of the wireless communication device, the group of power offsets being empirical data for power measurements;
        measures a received power of a signal at a neighboring cell frequency received by the wireless communication device from neighboring cell to determine a measured received power value;
        determines an offset power value by adjusting the measured receive power value according to the selected power offset, whereby the matching network is tuned to a reference frequency; and
        transmits, to a network element, the offset power value to cause the network element to make a radio resource decision for the wireless communication device based on the offset power value and not based on the measured receive power value,
        wherein the radio resource decision is a handover decision associated with the neighboring cell, and wherein the decision is based at least in part on whether the offset power value corresponds to a perceived neighbor signal strength above a handover threshold.

14. The wireless communication device of claim 13, wherein the controller adjusts the tuning state of the matching network based on a closed-loop process utilizing feedback that includes a power amplifier efficiency.

15. The wireless communication device of claim 13, wherein the empirical data is for tuning states at frequencies relative to the reference frequency, the reference frequency being within a radio band of a serving cell, wherein the empirical data is based on measured receive power for different tuning states of the matching network for the reference frequency of the radio band and is based on measured receive power for the different tuning states of the matching network for sub-band frequencies of the radio band.

16. The wireless communication device of claim 13, comprising a memory, wherein the group of power offsets are stored in a look-up table in the memory, and wherein the look-up table is categorized by one or more of radio bands, sub-bands, neighbor radio bands, neighbor sub-bands or use cases.

17. The wireless communication device of claim 16, wherein the controller determines a physical use case of the wireless communication device and selects the power offset based on the physical use case.

18. The wireless communication device of claim 13, wherein the controller adjusts the tuning state of the matching network based on at least one of the sub-band of operation of the wireless communication device or a use case of the wireless communication device, and wherein the matching network comprises one or more of a voltage tunable dielectric capacitor, a semiconductor varactor, a micro-electro-mechanical systems (MEMS) varactor, a semiconductor switched capacitor, or a MEMS switched capacitor.

19. A non-transitory computer-readable storage medium comprising computer instructions which, responsive to being executed by a processor of a communication device, cause the processor to perform operations comprising:
 adjusting a tuning state of a matching network of the communication device;
 selecting a power offset from among a group of power offsets according to a sub-band of operation of a neighboring cell of the communication device, the group of power offsets being empirical data for power measurements;
 measuring a received power of a signal at a neighboring cell frequency received by the communication device from the neighboring cell to determine a measured receive power value;
 determining an offset power value by adjusting the measured receive power value according to the selected power offset, whereby the matching network is tuned to a reference frequency; and
 transmitting, to a network element, the offset power value to cause the network element to make a radio resource decision for the communication device based on the offset power value and not based on the measured receive power value,
 wherein the radio resource decision is a handover decision associated with the neighboring cell, and wherein the decision is based at least in part on whether the offset power value corresponds to a perceived neighbor signal strength above a handover threshold.

20. The non-transitory computer-readable storage medium of claim 19, wherein the empirical data is for tuning states at frequencies relative to the reference frequency, the reference frequency being within a radio band of a serving cell,
 wherein the empirical data is based on measured receive power for different tuning states of the matching network for the reference frequency of the radio band and is based on measured receive power for the different tuning states of the matching network for sub-band frequencies of the radio band, and
 wherein the group of power offsets are stored in a look-up table that is categorized by one or more of radio bands, sub-bands, neighbor radio bands, neighbor sub-bands or use cases.

* * * * *

UNITED STATES PATENT AND TRADEMARK OFFICE
CERTIFICATE OF CORRECTION

PATENT NO. : 9,769,826 B2
APPLICATION NO. : 14/235994
DATED : September 19, 2017
INVENTOR(S) : Carsten Hoirup It is certified that error appears in the above-identified patent and that said Letters Patent is hereby corrected as shown below:

In the Claims

Claim 13, Column 14, Line 40, please delete "from neighboring cell" and insert --from the neighboring cell-- therefor.

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*